United States Patent
Song et al.

(10) Patent No.: US 12,513,505 B2
(45) Date of Patent: Dec. 30, 2025

(54) APPARATUS AND METHOD FOR E2 NODE CONTROL IN WIRELESS COMMUNICATION SYSTEM

(71) Applicant: Samsung Electronics Co., Ltd., Suwon-si (KR)

(72) Inventors: Junhyuk Song, Suwon-si (KR); Sunheui Ryoo, Suwon-si (KR); Chungkeun Lee, Suwon-si (KR); Sangkyou Ryou, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 18/185,094

(22) Filed: Mar. 16, 2023

(65) Prior Publication Data
US 2023/0224689 A1    Jul. 13, 2023

Related U.S. Application Data

(63) Continuation of application No. PCT/KR2022/005888, filed on Apr. 26, 2022.

(30) Foreign Application Priority Data

Apr. 26, 2021  (KR) .................... 10-2021-0053996

(51) Int. Cl.
*H04W 8/08* (2009.01)
*H04W 8/22* (2009.01)
(Continued)

(52) U.S. Cl.
CPC .............. *H04W 8/08* (2013.01); *H04W 8/22* (2013.01); *H04W 36/0033* (2013.01); *H04W 76/28* (2018.02)

(58) Field of Classification Search
CPC ..... H04W 24/02; H04W 92/12; H04W 88/12; H04W 24/10; H04W 88/18; H04W 28/16;
(Continued)

(56) References Cited

U.S. PATENT DOCUMENTS

| | | | |
|---|---|---|---|
| 2021/0051522 A1* | 2/2021 | Zhou ..................... | H04W 24/08 |
| 2022/0014963 A1* | 1/2022 | Yeh ........................ | G06N 3/045 |
| 2024/0057139 A1* | 2/2024 | Chandramouli ...... | H04W 24/10 |

FOREIGN PATENT DOCUMENTS

| | | | | |
|---|---|---|---|---|
| CN | 111654877 A | * | 9/2020 | ............ H04W 24/08 |
| EP | 4 301 055 A1 | | 1/2024 | |

(Continued)

OTHER PUBLICATIONS

Nokia, 5G RAN optimization using the O-RAN software community's RIC (RAN Intelligent Controller), ONS Europe, Sep. 23, 2019.

(Continued)

*Primary Examiner* — Dung Hong
(74) *Attorney, Agent, or Firm* — Jefferson IP Law, LLP

(57) ABSTRACT

The disclosure relates to a pre-$5^{th}$-Generation (5G) or 5G communication system to be provided for supporting higher data rates Beyond $4^{th}$-Generation (4G) communication system such as Long Term Evolution (LTE). According to embodiments of the disclosure, a method performed by a Radio Access Network (RAN) Intelligent Controller (RIC) is provided. The method includes receiving a report message from an E2 node, generating a control message, based on the report message, and transmitting the control message to the E2 node. The control message may include an RAN configuration related to the E2 node. The report message may include at least one of User Equipment (UE) assistance information transmitted from a UE and UE expected behav- (Continued)

ior-related information transmitted from an Access and Mobility management Function (AMF).

20 Claims, 16 Drawing Sheets

(51) Int. Cl.
*H04W 36/00* (2009.01)
*H04W 76/28* (2018.01)

(58) Field of Classification Search
CPC ....... H04W 92/24; H04W 60/04; H04W 8/08; H04W 76/28; H04W 8/22; H04W 36/0033
See application file for complete search history.

(56) References Cited

FOREIGN PATENT DOCUMENTS

| | | | |
|---|---|---|---|
| KR | 10-2021-0042040 | A | 4/2021 |
| WO | 2020/223668 | A1 | 11/2020 |
| WO | 2021/066587 | A1 | 4/2021 |
| WO | 2021/071324 | A1 | 4/2021 |
| WO | 2021/071325 | A1 | 4/2021 |

OTHER PUBLICATIONS

O-RAN Software Community "A" Release Requirements, Jun. 24, 2020.
3rd Generation Partnership Project; Technical Specification Group Radio Access Network; NR; Radio Resource Control (RRC) protocol specification (Release 16), 3GPP TS 38.331 V16.4.1, Mar. 30, 2021.
3rd Generation Partnership Project; Technical Specification Group Radio Access Network; NG-RAN; NG Application Protocol (NGAP) (Release 16), 3GPP TS 38.413 V16.5.0, Apr. 9, 2021.
International Search Report dated Aug. 9, 2022, issued in International Application No. PCT/KR2022/005888.
O-Ran, O-RAN Working Group 3 Near-Real-time RAN Intelligent Controller Architecture & E2 General Aspects and Principles, O-RAN.WG3.E2GAP-v02.00.1, XP093179170, Feb. 23, 2021.
O-Ran, ORAN-WG3.E2SM-RC—Section 6.2 text rev.4, ORAN-WG.3-E2SM-RC-CR NOK-0004, XP093179148, Apr. 14, 2021.
O-Ran, ORAN-WG3.E2SM-RC—Section 7 text and Annex A, ORAN-WG3.E2SM-RC-CR NOK-0005, XP093179152, Apr. 21, 2021.
O-Ran, Policy related text for section 6 and proposed Annex A Source to WG: Nokia, ORAN-WG3.E2SM-RC-CR NOK-0002, XP093179142, Mar. 23, 2021.
European Search Report dated Jul. 8, 2024, issued in European Application No. 22796078.8.

\* cited by examiner

UE Assitance Information:
The purpose of this procedure is to inform the network of the UE's delay budget report carrying desired increment/decrement in the connected mode DRX cycle length, or overheating assistance information.

APPARATUS AND METHOD FOR E2 NODE CONTROL IN WIRELESS COMMUNICATION SYSTEM

CROSS-REFERENCE TO RELATED APPLICATION(S)

This application is a continuation application, claiming priority under § 365(c), of an International application No. PCT/KR2022/005888, filed on Apr. 26, 2022, which is based on and claims the benefit of a Korean patent application number 10-2021-0053996, filed on Apr. 26, 2021, in the Korean Intellectual Property, the disclosure of which is incorporated by reference herein in its entirety.

TECHNICAL FIELD

The disclosure relates to an apparatus and method for controlling an E2 node by a Radio Access Network (RAN) Intelligent Controller (RIC) in a radio access network. More particularly, the disclosure relates to an apparatus and method for controlling an E2 node through an E2 message conforming to an Open Radio Access Network (O-RAN) standard of a wireless communication system.

BACKGROUND ART

To meet the demand for wireless data traffic, which has increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To meet the demand for wireless data traffic, a 5G system or a New Radio or Next Radio (NR) system has been commercialized, thereby providing a service with a high data rate to a user by using the 5G system similarly to 4G. In addition, it is expected that a wireless communication service is provided with various purposes such as Internet of Things and services requiring high reliability for specific purposes. In a current system in which a 4G communication system and a 5G communication system are used together, an Open Radio Access Network (O-RAN) established by vendors and equipment providers together defines a new Network Element (NE) and interface standard according to the existing $3^{rd}$ generation Partnership Project (3GPP) standard, and provides an O-RAN architecture.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an apparatus and method for controlling an E2 node by a Radio Access Network (RAN) Intelligent Controller (RIC) in a radio access network.

Another aspect of the disclosure is to provide an apparatus and method for configuring an E2 node by an RIC in a specific mode so that the E2 node operates under the control of the RIC.

Additional aspects will be set forth in part in the description which follows and, in part, will be apparent from the description, or may be learned by practice of the presented embodiments.

Technical Solution

In accordance with an aspect of the disclosure, a method performed by a Radio Access Network (RAN) Intelligent Controller (RIC) is provided. The method includes receiving a report message from an E2 node, generating a control message based on the report message, and transmitting the control message to the E2 node. The control message may include an RAN configuration related to the E2 node. The report message may include at least one of User Equipment (UE) assistance information transmitted from a UE and UE expected behavior-related information transmitted from an Access and Mobility management Function (AMF).

In accordance with another aspect of the disclosure, a method performed by an E2 node is provided. The method includes transmitting a report message to an RIC, and receiving a control message generated based on the report message from the E2 node. The control message may include an RAN configuration related to the E2 node. The report message may include at least one of UE assistance information transmitted from a UE and UE expected behavior-related information transmitted from an AMF.

In accordance with another aspect of the disclosure, an apparatus of an RIC is provided. The apparatus includes at least one transceiver, and at least one processor configured to control the transceiver to receive a report message from an E2 node, to generate a control message based on the report message, and control the at least one transceiver to transmit the control message to the E2 node. The control message may include an RAN configuration related to the E2 node. The report message may include at least one of UE assistance information transmitted from a UE and UE expected behavior-related information transmitted from an AMF.

In accordance with another aspect of the disclosure, an apparatus operating using an E2 node is provided. The apparatus includes at least one transceiver, and at least one processor. The at least one processor may be configured to transmit a report message to an RIC, and receive a control message generated based on the report message from the E2 node. The control message may include an RAN configuration related to the E2 node. The report message may include at least one of UE assistance information transmitted from a UE and UE expected behavior-related information transmitted from an AMF.

Advantageous Effects

An apparatus and method according to various embodiments of the disclosure allow a Radio Access Network (RAN) Intelligent Controller (RIC) to control an E2 node.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
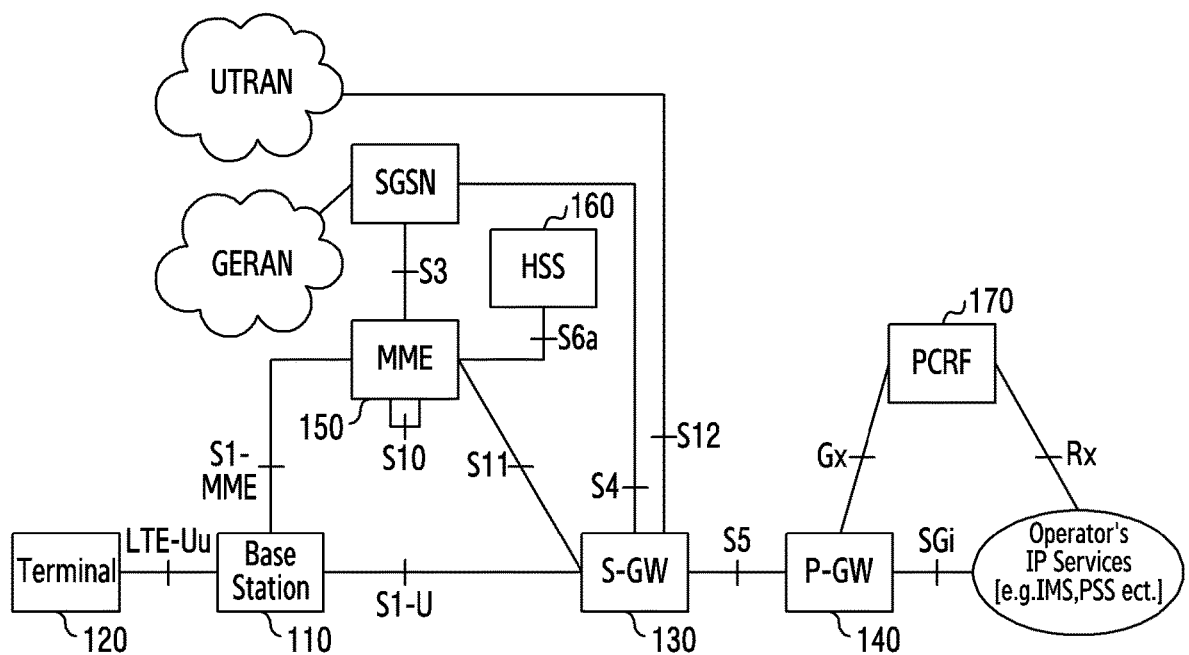
FIG. 1 illustrates an example of a 4th generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described in various embodiments of the disclosure described hereinafter. However, since these various embodiments of the disclosure include a technique in which hardware and software are both used, a software-based approach is not excluded in the various embodiments of the disclosure.

Hereinafter, the disclosure relates to an apparatus and method for performing a subscription procedure between an apparatus in a Radio Access Network (RAN) and an apparatus for controlling the RAN in a wireless communication system. Specifically, the disclosure relates to an apparatus and method for measuring performance for each terminal on an E2 interface in a radio access network, and a resource management for each slice of a base station. The disclosure relates to an apparatus and method for transmitting a container-based measurement message when a service event occurs for the base station which conforms to an Open Radio Access Network (O-RAN) standard using an E2 message of the wireless communication system.

Terms used hereinafter to refer to a signal, a channel, control information, network entities, a component of a device, or the like are exemplified for convenience of explanation. Therefore, the disclosure is not limited to the terms described below, and thus other terms have the same technical meaning may also be used.

In addition, although an expression 'greater than' or 'less than' is used in the disclosure to determine whether a specific condition is fulfilled, this is for purposes only and does not exclude an expression of 'greater than or equal to' or 'less than or equal to'. A condition described as "greater than or equal to" may be replaced with "greater than" A condition described as "less than or equal to" may be replaced with "less than" A condition described as "greater than or equal to and less than" may be replaced with "greater than and less than or equal to".

In addition, although the disclosure describes various embodiments by using terms used in some communication standards (e.g., $3^{rd}$ generation Partnership Project (3GPP), Open Radio Access Network (O-RAN)), this is for purposes only. Various embodiments of the disclosure may be easily modified and applied to other communication systems.

Since a $4^{th}$ generation (4G)/$5^{th}$ generation (5G) communication system (e.g., New Radio (NR)) has currently been commercialized, it is required to support a user-specific service in a virtualized network. 3GPP is a joint research project between mobile communication-related organizations and aims to create a 3G mobile communication system standard—applicable worldwide—within a scope of the IMT-2000 project of the International Telecommunication Union (ITU). The 3GPP was established in December 1998. The 3GPP standard is based on an advanced GSM standard, and includes radio and core networks and a service architecture within a scope of standardization. Accordingly, an O-RAN has newly defined a Radio Unit (RU), a Digital Unit (DU), a Central Unit (CU)-Control Plane (CP), and a CU-User Plane (UP), i.e., nodes constituting a 3GPP Network Entity (NE) and a base station, respectively as an O-RAN (O)-RU, an O-DU, an O-CU-CP, and an O-CU-UP. In addition thereto, the O-RAN has standardized a Near-Real-Time (NRT) Radio Access Network (RAN) Intelligent Controller (RIC). The disclosure is for supporting an operator specific model in an E2 interface through which the RIC requests the O-DU, the O-CU-CP, or the O-CU-UP to provide a service. Herein, the O-RU, the O-DU, the O-CU-CP, and the O-CU-UP may be understood as objects constituting an RAN which may operate according to the O-RAN standard, and may be referred to as an E2 node. An interface with the objects constituting the RAN which may operate according to the O-RAN standard between the RIC and the E2 nodes uses an E2 Application Protocol (E2AP).

The RIC is a logical node capable of collecting information in a cell site in which a terminal performs transmission/reception with respect to the O-DU, O-CU-CP, or O-CU-UP. The RIC may be implemented in the form of a server deployed in one physical place in a concentrated manner. A connection between the O-DU and the RIC, between the O-CU-CP and the RIC, and between the O-CU-UP and the RIC may be established through the Ethernet. To this end, an interface standard for communication between the O-DU and the RIC, between the O-CU-CP and the RIC, and between the O-CU-UP and the RIC is required, and a message standard such as E2-DU, E2-CU-CP, E2-CU-UP, or the like is required to define a procedure between the RIC and the O-DU, O-CU-CP, and O-CU-UP. In particular, a user-specific service is required in a virtualized network, and there is a need to define a function of a message of the E2-DU, E2-CU-CP, and E2-CU-UP to support a service for wide cell coverage by allowing a call processing message/function generated in the O-RAN to be concentrated in the RIC.

The RIC may perform communication to the O-DU, the O-CU-CP, and the O-CU-UP by using the E2 interface, and may configure an event occurrence condition by generating and transmitting a subscription message. Specifically, the RIC may generate an E2 subscription request message and may transfer the E2 subscription request message to an E2 node (e.g., the O-CU-CP, the O-CU-UP, and the O-DU) to configure a call processing event. In addition, after configuring the event, the E2 node transfers a subscription request response message transferred to the RIC.

The E2 node may transmit a current state to the RIC through an E2 indication/report. The RIC may provide a control for the O-DU, O-CU-CP, and O-CU-UP by using an E2 control message. Various embodiments of the disclosure propose an E2 indication message through which User Equipment (UE)-based measurement information is transmitted, every period configured in the O-DU under a subscription event condition. In addition, various embodiments of the disclosure propose a message for controlling a resource to be transmitted from the RIC to the O-DU.

FIG. 1 illustrates an example of a $4^{th}$ generation (4G) long term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME). 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer status, an available transmission power, and a channel status of the terminal 120. The base station 110 has coverage defined as a specific geographic region based on a signal transmission distance. The base station 110 is connected to the MME 150 via an S1-MME interface. In addition to the term 'base station', the base station 110 may be referred to as an 'access point (AP)', an 'evolved NodeB (e NodeB, eNB)', a 'wireless point', a 'transmission/reception point (TRP)' or other term having an equivalent technical meaning.

The terminal 120 is a device used by the user, and communicates with the base station 110 over a radio channel. In some cases, the terminal 120 may be operated without the user's involvement. At least one of the terminal 120 and the S-GW 130 is a device which performs machine type communication (MTC), and may not be carried by the user. In addition to the term 'terminal', the terminal 120 may be referred to as a 'UE', a 'mobile station', a 'subscriber station', 'customer-premises equipment (CPE)', a 'remote terminal', a 'wireless terminal', or a 'user device' or other term having the equivalent technical meaning.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an internet network). In addition, the P-GW 140 allocates an internet protocol (IP) address to the terminal 120, and serves as an anchor for the S-GW 130. In addition, the P-GW 140 may apply quality of service (QoS) policy of the terminal 120, and manage account data.

The MME 150 manages mobility of the terminal 120. In addition, the MME 150 may perform authentication, bearer management, and the like on the terminal 120. The MME 150 is responsible for mobility management and various control functions of the terminal. The MME 150 may interwork with a serving general packet radio service (GPRS) support node (SGSN).

The HSS 160 stores key information and a subscriber profile for the authentication of the terminal 120. The key information and the subscriber profile are transmitted from the HSS 160 to the MME 150 if the terminal 120 accesses the network.

The PCRF 170 defines a policy and a charging rule. The stored information is forwarded from the PCRF 180 to the P-GW 140, and the P-GW 140 may control the terminal 120 (e.g., QoS management, charging, etc.) based on the information provided from the PCRF 180.

Carrier aggregation (CA) technology is a technology which combines a plurality of component carriers, and transmits and receives at one terminal a signal using the plurality of the component carriers at the same time and thus increases frequency use efficiency in terms of the terminal or the base station. According to the CA technology, the terminal and the base station may transmit and receive signals using a broadband using the plurality of the component carriers in the uplink (UL) and the downlink (DL), wherein the component carriers are located in different frequency bands respectively. Hereafter, the UL indicates a communication link through which the terminal transmits a signal to the base station, and the DL indicates a communication link through which the base station transmits a signal to the terminal. At this time, the numbers of uplink component carriers and downlink component carriers may be different.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations positioned in different frequency bands. The terminal may be connected to a first base station (e.g., a base station which provides services using the LTE technology or the 4G mobile communication technology) and a second base station (e.g., a base station which provides services using the NR technology or 5G mobile communication technology) at the same time to transmit and receive traffic. In this case, frequency resources used by each base station may be positioned in different bands. As such, the operation scheme based on the dual connectivity scheme of the LTE and the NR may be referred to as 5G non-standalone (NSA).

Figure 2A:
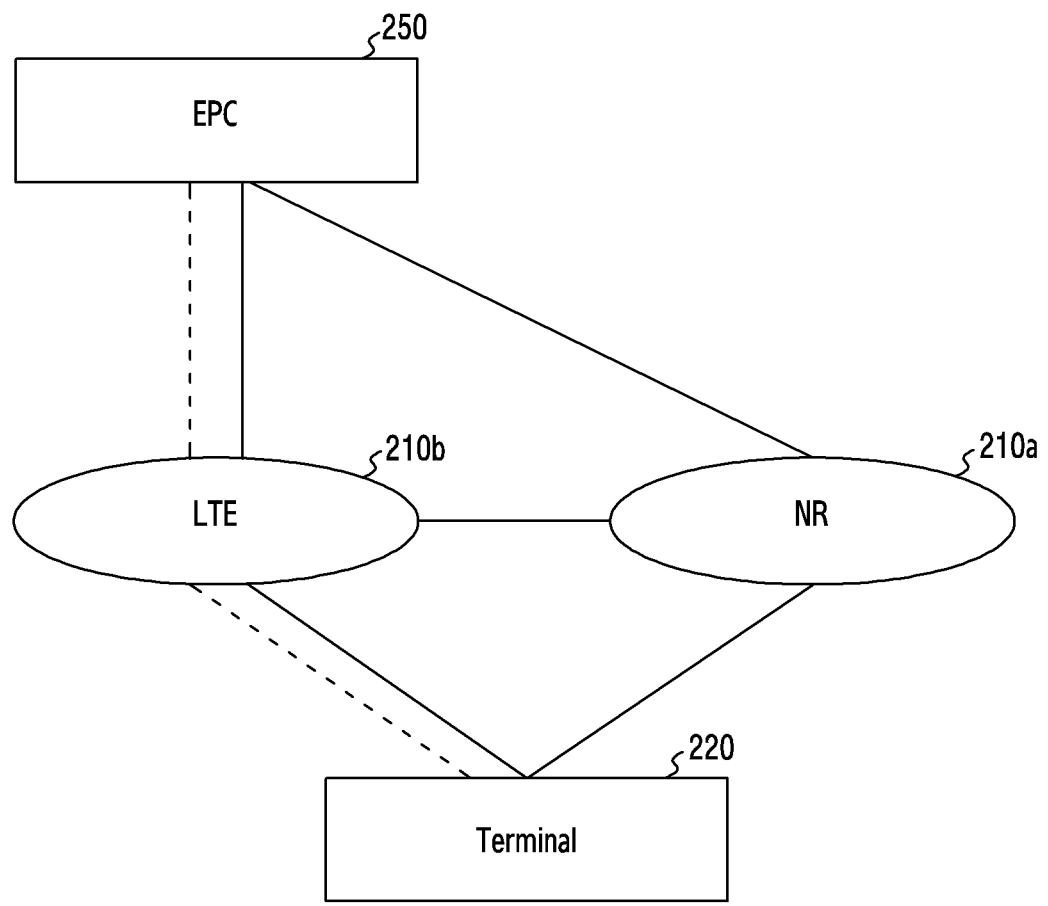
FIG. 2A illustrates an example of a $5^{th}$ generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, and an evolved packet core network (EPC) 250. The NR RAN 210a and the LTE RAN 210b are connected to the EPC 250, and the terminal 220 may be served by any one or both of the NR RAN 210a and the LTE RAN 210b at the same time. The NR RAN 210a includes at least one NR base station, and the LTE RAN 210b includes at least one LTE base station. Herein, the NR base station may be referred to as a '5G node', a 'gNB' or other term having the equivalent technical meaning. In addition, the NR base station may have a structure divided into a CU and a DU, and the CU may also have a structure divided into a CU-CP unit and a CU-UP unit.

In the structure shown in FIG. 2A, the terminal 220 may perform radio resource control (RRC) access through the first base station (e.g., a base station belonging to the LTE RAN 210b), and may be served with functions (e.g., connection management, mobility management, etc.) provided in the control plane. In addition, the terminal 220 may receive additional radio resources for transmitting and receiving data via a second base station (e.g., a base station belonging to the NR RAN 210a). This dual connectivity technology using the LTE and the NR may be referred to as evolved universal terrestrial radio access (E-UTRA)-NR (EN)-dual connectivity (DC). Similarly, the dual connectivity technology in which the first base station uses the NR technology and the second base station uses the LTE technology is referred to as NR-E-UTRA (NE)-DC. In addition, various embodiments of the disclosure may be applied to the multi connectivity and the CA technology of various types. In addition, various embodiments may be applicable even if a first system using a first communication technology and a second system using a second communication technology are implemented in one device or if the first base station and the second base station are located at the same geographic location.

Figure 2B:
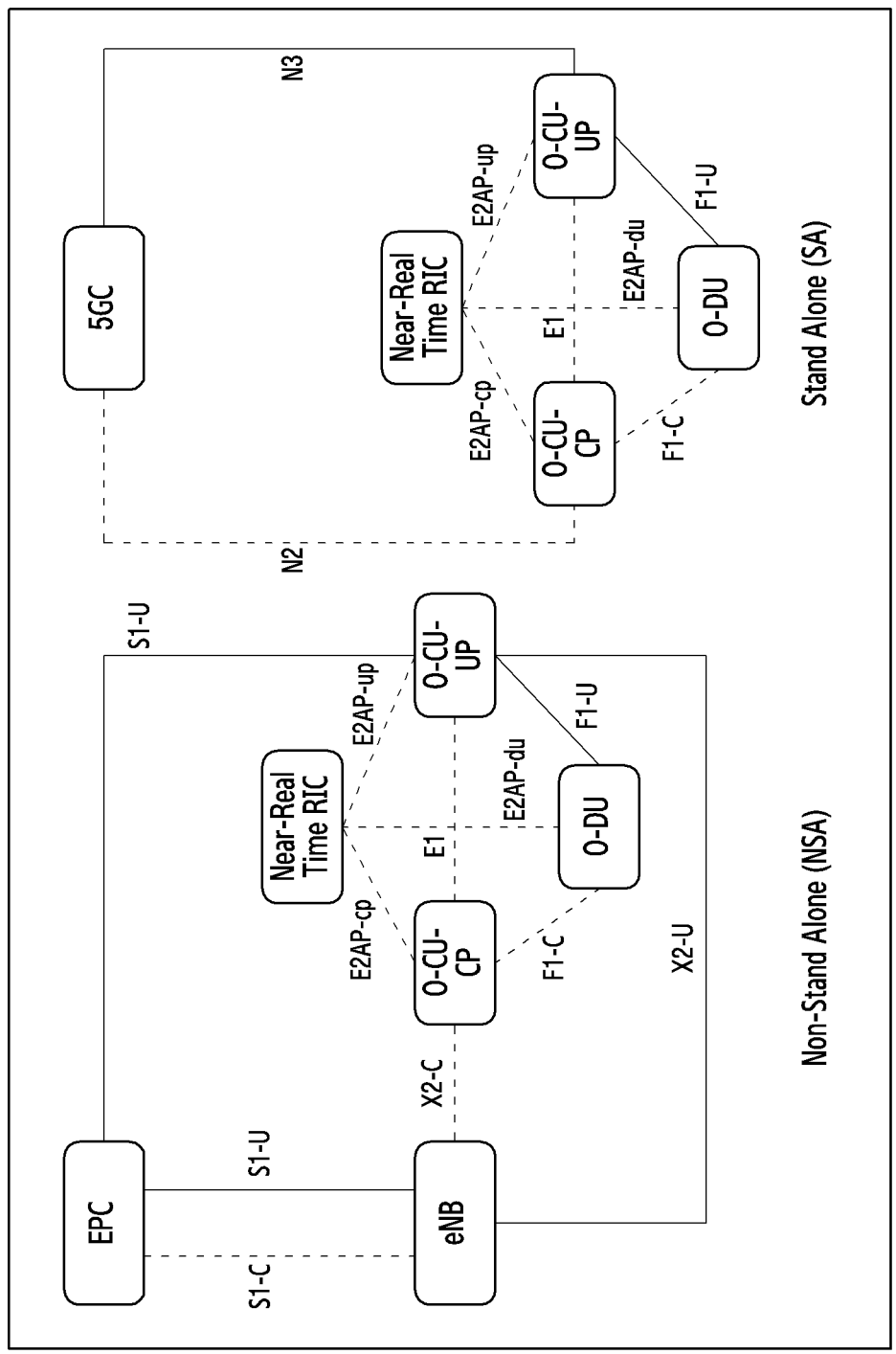
FIG. 2B illustrates an example of architecture for open (O)-radio access network (RAN) according to an embodiment of the disclosure.

FIG. 2B shows an architecture example for the O-RAN according to an embodiment of the disclosure.

Referring to FIG. 2B, for the sake of E2-SM-KPI monitoring (KPIMON) of an E2 service model, an O-RAN non-standalone in the multi-connectivity operation using the E-UTRA and the NR radio access technology is considered, whereas the E2 node may be assumed to be in an O-RAN standalone mode.

Referring to FIG. 2B, in deployment of the O-RAN non-standalone mode, the eNB is connected with the EPC via an S1-C/S1-U interface, and is connected with the O-CU-CP via an X2 interface. The O-CU-CP for the deployment of the O-RAN standalone mode may be connected with a 5G core (5GC) through an N2/N3 interface.

Figure 3:
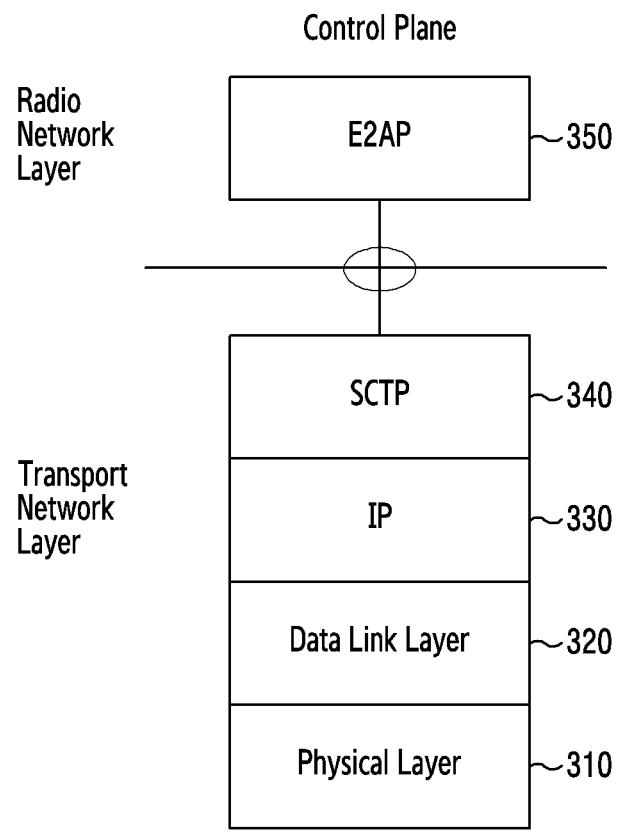
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an internet protocol (IP) layer 330, and a stream control transmission protocol (SCTP) layer 340.

The radio network layer includes an E2 application protocol (E2AP) 350. The E2AP 350 is used to deliver a subscription message, an indication message, a control message, a service update message, and a service query message, and is transmitted in a higher layer of the SCTP layer 340 and the IP layer 330.

Figure 4:
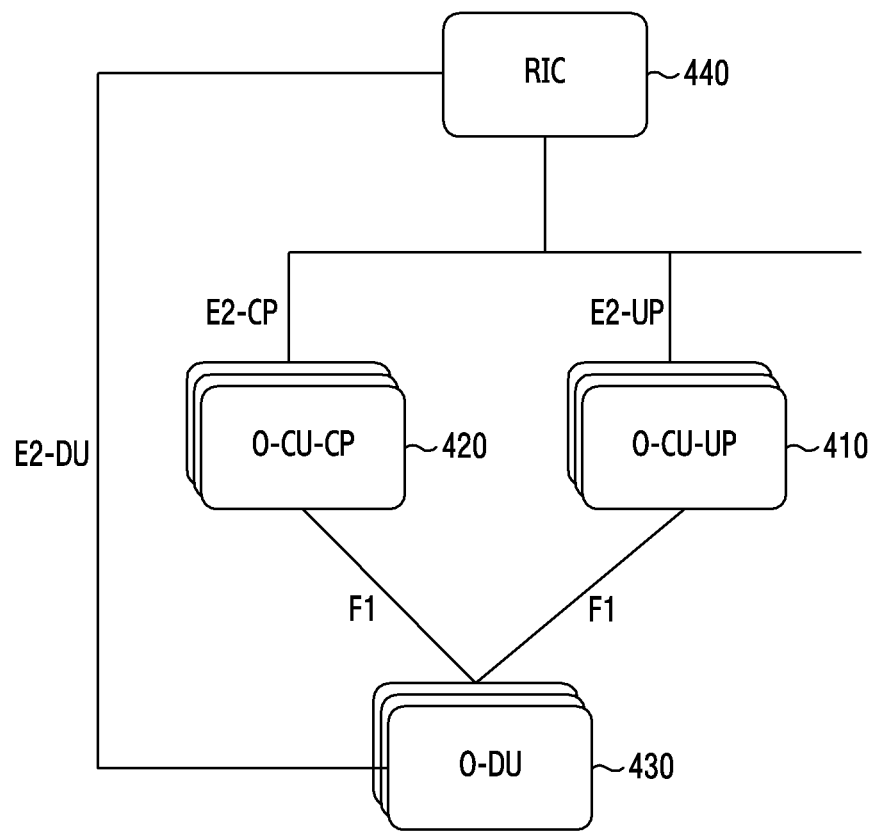
FIG. 4 illustrates an example of a connection between a base station and a radio access network (RAN) intelligence controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is connected to an O-CU-CP 420, an O-CU-UP 410, and an O-DU 430. The RIC 440 is a device for controlling an RAN node (or a device for performing an RAN function, for example, the O-CU-CP 420, the O-CU-UP 410, and the O-DU 430). The RIC 440 may be defined as a device for customizing RAN functionality for a new service or regional resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected to each node via E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist, according to various embodiments. The plurality of the RICs may be implemented with a plurality of hardware located at the same physical location or may be implemented through virtualization using single hardware.

Figure 5:
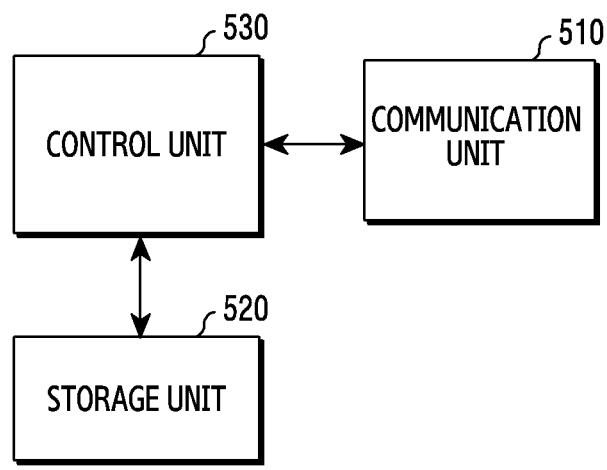
FIG. 5 illustrates a configuration of a device in a radio access network according to an embodiment of the disclosure.

FIG. 5 illustrates a configuration of a device according to an embodiment of the disclosure.

The structure illustrated in FIG. 5 may be understood as a configuration of a device having at least one function of the RIC, the O-CU-CP, the O-CU-UP, and the O-DU of FIG. 5. A term such as '... unit' or '... er' used hereafter indicates a unit for processing at least one function or operation, and may be implemented using hardware, software, or a combination of hardware and software.

Referring to FIG. 5, a core network device includes a communication unit 510 (e.g., a transceiver), a storage unit 520 (e.g., a memory), and a control unit 530 (e.g., a processor).

The communication unit 510 provides an interface for performing communication with other devices in the network. The communication unit 510 converts a bit string transmitted from the core network device to other device into a physical signal, and converts a physical signal received from other device into a bit string. The communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., wired backhaul or wireless backhaul) or over the network.

The storage unit 520 stores data such as a basic program, an application program, and setting information for the operations of the core network device. The storage unit 520 may include a volatile memory, a nonvolatile memory, or a combination of a volatile memory and a nonvolatile memory. The storage unit 520 provides the stored data according to a request of the control unit 530.

The control unit 530 controls general operations of the core network device. For example, the control unit 530 transmits and receives signals through the communication unit 510. In addition, the control unit 530 records and reads data in and from the storage unit 520. For doing so, the control unit 530 may include at least one processor. According to various embodiments, the control unit 530 may control the device to carry out operations according to various embodiments explained in the disclosure.

Figure 6:
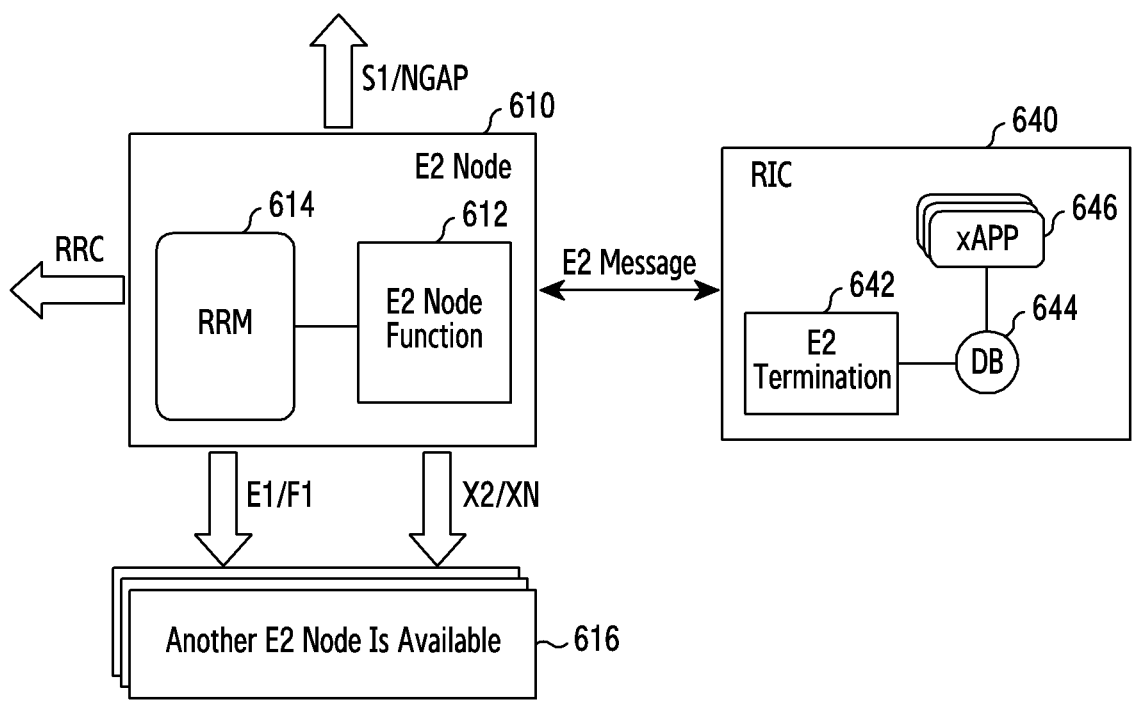
FIG. 6 illustrates logical functions related to E2 messages of an E2 node and an RIC in a radio access network according to an embodiment of the disclosure.

FIG. 6 illustrates logical functions related to E2 messages of an E2 node and an RIC in a radio access network according to an embodiment of the disclosure.

Referring to FIG. 6, an RIC 640 and an E2 node 610 may transmit or receive an E2 message with each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through the E1 interface or the F1 interface. Alternatively, for example, the E2 node 610 may communicate with the E2 node 616 through an X2 interface or an XN interface. In another example, the E2 node 610 may perform communication through an S1 interface or a next generation application protocol (NGAP) interface (i.e., an interface between a next generation (NG) RAN node and an access and mobility management function (AMF)).

The E2 node 610 may include an E2 node function 612. The E2 node function 612 is a function corresponding to a specific xApp (e.g., application software (S/W)) 646 installed in the RIC 640. For example, in the KPI monitor, KPI monitor collection S/W may be installed in the RIC 640, and the E2 node 610 may include the E2 node function 612 which generates KPI parameters, and then forwards an E2 message including the KPI parameters to an E2 termination 642 positioned at the RIC 640. The E2 node 610 may include a radio resource management (RRM) 614. The E2 node 610 may manage resources provided to the radio network for the terminal.

The E2 termination 642 positioned in the RIC 640, which is the termination of the RIC 640 for the E2 message, may perform a function of interpreting the E2 message forwarded by the E2 node 610 and then transferring the E2 message to the xApp 646. A database (DB) 644 positioned in the RIC 640 may be used for the E2 termination 642 or the xApp 646. The E2 node 610 shown in FIG. 6 is a termination of at least one interface, and may be understood as a termination of messages transmitted to a terminal, a neighbor base station, and a core network.

1. Control of Near-RT RIC

Embodiments of the disclosure propose a method of transferring UE-related information to be transferred from a core network to an E2 node and UE-related information to be transferred by a UE through an RAN, to a near-RT RIC through an E2SM-RC report.

Figure 7:
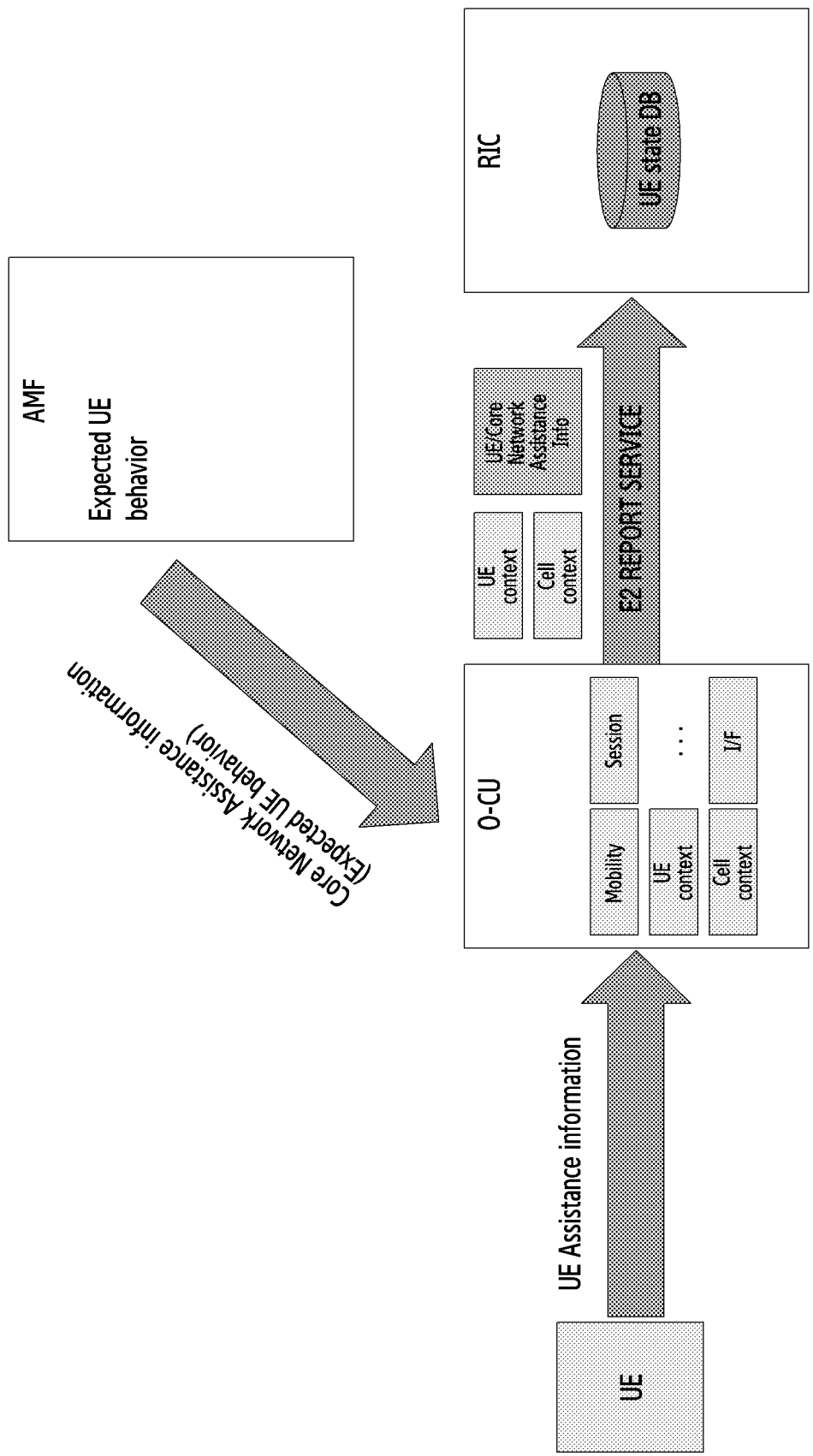
FIG. 7 illustrates examples of sharing UE context or cell context information between a CU node and an RIC according to an embodiment of the disclosure.

FIG. 7 illustrates examples of sharing UE context or cell context information between a CU node and an RIC according to an embodiment of the disclosure.

Referring to FIG. 7, the RIC may be a near-RT RIC. The CU node is an O-CU, and stores UE assistance information received through an RRC of UEs and UE's core network assistance information (expected UE behavior) received from an AMF. The stored UE's information may be transferred to the RIC by means of an E2 report message.

Referring to FIG. 7, the CU node may receive a UE assistance information message from the UE. The CU node may receive the UE assistance information message from higher layer signaling (e.g., Radio Resource Control (RRC) signaling). The UE assistance information message may be used to indicate the UE assistance information to a network. A signaling radio bearer may be SRB1 or SRB3. 'UEAssistanceInformation' of the standard 3GPP TS 38.331 may be used for reference. For example, the UE assistance information message may be configured as shown in Tables 1 and 2 below.

TABLE 1

UEAssistanceInformation message

```
-- ASN1START
-- TAG-UEASSISTANCEINFORMATION-START
UEAssistanceInformation ::=               SEQUENCE {
    criticalExtensions                    CHOICE {
        ueAssistanceInformation               UEAssistanceInformation-IEs,
        criticalExtensionsFuture              SEQUENCE { }
    }
}
UEAssistanceInformation-IEs ::=           SEQUENCE {
    delayBudgetReport                         OPTIONAL,
                    lateNonCriticalExtension                        OCTET STRING                OPTIONAL,
        nonCriticalExtension                  UEAssistanceInformation-v1540-IEs  OPTIONAL
}
DelayBudgetReport::=                      CHOICE {
    type1                          ENUMERATED {
                    msMinus1280, msMinus640, msMinus320, msMinus160,msMinus80, msMinus60, msMinus40,
                    msMinus20, ms0, ms20,ms40, ms60, ms80, ms160, ms320, ms640, ms1280},
    ...
}
UEAssistanceInformation-v1540-IEs ::= SEQUENCE {
    overheatingAssistance                  OverheatingAssistance   OPTIONAL,
        nonCriticalExtension                  UEAssistanceInformation-v1610-IEs  OPTIONAL
}
OverheatingAssistance ::=                 SEQUENCE {
                    reducedMaxCCs                              ReducedMaxCCs-r16          OPTIONAL,
                    reducedMaxBW-FR1                           ReducedMaxBW-FRx-r16       OPTIONAL,
                    reducedMaxBW-FR2                           ReducedMaxBW-FRx-r16       OPTIONAL,
    reducedMaxMIMO-LayersFR1                  SEQUENCE {
        reducedMIMO-LayersFR1-DL              MIMO-LayersDL,
        reducedMIMO-LayersFR1-UL              MIMO-LayersUL
    } OPTIONAL,
    reducedMaxMIMO-LayersFR2                  SEQUENCE {
        reducedMIMO-LayersFR2-DL              MIMO-LayersDL,
        reducedMIMO-LayersFR2-UL              MIMO-LayersUL
    } OPTIONAL
}
ReducedAggregatedBandwidth ::= ENUMERATED {mhz0, mhz10, mhz20,
mhz30, mhz40, mhz50, mhz60, mhz80, mhz100, mhz200, mhz300, mhz400}
UEAssistanceInformation-v1610-IEs ::= SEQUENCE {
    idc-Assistance-r16                     IDC-Assistance-r16          OPTIONAL,
    drx-Preference-r16                     DRX-Preference-r16          OPTIONAL,
                    maxBW-Preference-r16                       MaxBW-Preference-r16       OPTIONAL,
                    maxCC-Preference-r16                       MaxCC-Preference-r16       OPTIONAL,
        maxMIMO-LayerPreference-r16               MaxMIMO-LayerPreference-r16  OPTIONAL,
        minSchedulingOffsetPreference-r16         MinSchedulingOffsetPreference-r16  OPTIONAL,
    releasePreference-r16                  ReleasePreference-r16       OPTIONAL,
        sl-UE-AssistanceInformationNR-r16         SL-UE-AssistanceInformationNR-r16   OPTIONAL,
                                            referenceTimeInfoPreference-r16   BOOLEAN         OPTIONAL,
    nonCriticalExtension                   SEQUENCE { }            OPTIONAL
}
IDC-Assistance-r16 ::=                    SEQUENCE {
        affectedCarrierFreqList-r16               AffectedCarrierFreqList-r16     OPTIONAL,
        affectedCarrierFreqCombList-r16           AffectedCarrierFreqCombList-r16 OPTIONAL,
    ...
}
AffectedCarrierFreqList-r16 ::= SEQUENCE (SIZE (1.. maxFreqIDC-r16)) OF AffectedCarrierFreq-r16
AffectedCarrierFreq-r16 ::=               SEQUENCE {
    carrierFreq-r16                        ARFCN-ValueNR,
    interferenceDirection-r16              ENUMERATED {nr, other, both, spare}
}
```

TABLE 1-continued

UEAssistanceInformation message

```
AffectedCarrierFreqCombList-r16 ::= SEQUENCE (SIZE (1..maxCombIDC-
r16)) OF AffectedCarrierFreqComb-r16
AffectedCarrierFreqComb-r16 ::=              SEQUENCE {
       affectedCarrierFreqComb-r16   SEQUENCE   (SIZE
(2..maxNrofServingCells)) OF ARFCN-ValueNR                  OPTIONAL,
    victimSystemType-r16                    VictimSystemType-r16
}
VictimSystemType-r16 ::=       SEQUENCE {
    gps-r16              ENUMERATED {true}     OPTIONAL,
    glonass-r16          ENUMERATED {true}     OPTIONAL,
    bds-r16              ENUMERATED {true}     OPTIONAL,
    galileo-r16          ENUMERATED {true}     OPTIONAL,
    navIC-r16            ENUMERATED {true}     OPTIONAL,
    wlan-r16             ENUMERATED {true}     OPTIONAL,
    bluetooth-r16        ENUMERATED {true}     OPTIONAL,
    ...
}
DRX-Preference-r16 ::=                      SEQUENCE {
    preferredDRX-InactivityTimer-r16        ENUMERATED {
                        ms0, ms1, ms2, ms3, ms4, ms5, ms6, ms8, ms10,
ms20, ms30, ms40, ms50, ms60, ms80,
                        ms100, ms200, ms300, ms500, ms750, ms1280,
ms1920, ms2560, spare9, spare8,
                        spare7, spare6, spare5, spare4, spare3, spare2,
spare1} OPTIONAL,
    preferredDRX-LongCycle-r16              ENUMERATED {
                        ms10, ms20, ms32, ms40, ms60, ms64, ms70, ms80,
ms128, ms160, ms256, ms320, ms512,
                        ms640, ms1024, ms1280, ms2048, ms2560, ms5120,
ms10240, spare12, spare11, spare10,
                        spare9, spare8, spare7, spare6, spare5, spare4,
spare3, spare2, spare1 } OPTIONAL,
    preferredDRX-ShortCycle-r16             ENUMERATED {
                        ms2, ms3, ms4, ms5, ms6, ms7, ms8, ms10, ms14,
ms16, ms20, ms30, ms32,
                        ms35, ms40, ms64, ms80, ms128, ms160, ms256,
ms320, ms512, ms640, spare9,
                        spare8, spare7, spare6, spare5, spare4, spare3,
spare2, spare1 } OPTIONAL,
    preferredDRX-ShortCycleTimer-r16        INTEGER (1..16)   OPTIONAL
}
MaxBW-Preference-r16 ::=                    SEQUENCE {
               reducedMaxBW-FR1-r16                     ReducedMaxBW-FRx-
r16          OPTIONAL,
               reducedMaxBW-FR2-r16                     ReducedMaxBW-FRx-
r16          OPTIONAL
}
MaxCC-Preference-r16 ::=                    SEQUENCE {
               reducedMaxCCs-r16                        ReducedMaxCCs-
r16          OPTIONAL
}
MaxMIMO-LayerPreference-r16 ::=             SEQUENCE {
    reducedMaxMIMO-LayersFR1-r16            SEQUENCE {
      reducedMIMO-LayersFR1-DL-r16          INTEGER (1..8),
      reducedMIMO-LayersFR1-UL-r16          INTEGER (1..4)
    } OPTIONAL,
    reducedMaxMIMO-LayersFR2-r16            SEQUENCE {
      reducedMIMO-LayersFR2-DL-r16          INTEGER (1..8),
      reducedMIMO-LayersFR2-UL-r16          INTEGER (1..4)
    } OPTIONAL
}
MinSchedulingOffsetPreference-r16 ::= SEQUENCE {
    preferredK0-r16                         SEQUENCE {
       preferredK0-SCS-15kHz-r16            ENUMERATED {sl1, sl2, sl4,
sl6}         OPTIONAL,
       preferredK0-SCS-30kHz-r16            ENUMERATED {sl1, sl2, sl4,
sl6}         OPTIONAL,
       preferredK0-SCS-60kHz-r16            ENUMERATED {sl2, sl4, sl8,
sl12}        OPTIONAL,
       preferredK0-SCS-120kHz-r16           ENUMERATED {sl2, sl4, sl8,
sl12}        OPTIONAL
    }                                                   OPTIONAL,
    preferredK2-r16                         SEQUENCE {
       preferredK2-SCS-15kHz-r16            ENUMERATED {sl1, sl2, sl4,
sl6}         OPTIONAL,
```

TABLE 1-continued

| UEAssistanceInformation message |
|---|

```
        preferredK2-SCS-30kHz-r16              ENUMERATED {sl1, sl2, sl4,
sl6}             OPTIONAL,
        preferredK2-SCS-60kHz-r16              ENUMERATED {sl2, sl4, sl8,
sl12}            OPTIONAL,
        preferredK2-SCS-120kHz-r16             ENUMERATED {sl2, sl4, sl8,
sl12}            OPTIONAL
    }                                                  OPTIONAL
}
ReleasePreference-r16 ::=          SEQUENCE {
    preferredRRC-State-r16             ENUMERATED {idle, inactive, connected,
outOfConnected}
}
ReducedMaxBW-FRx-r16 ::=            SEQUENCE {
    reducedBW-DL-r16                   ReducedAggregatedBandwidth,
    reducedBW-UL-r16                   ReducedAggregatedBandwidth
}
ReducedMaxCCs-r16 ::=              SEQUENCE {
    reducedCCsDL-r16                   INTEGER (0..31),
    reducedCCsUL-r16                   INTEGER (0..31)
}
SL-UE-AssistanceInformationNR-r16   ::=  SEQUENCE  (SIZE
(1..maxNrofTrafficPattern-r16)) OF SL-TrafficPatternInfo-r16
SL-TrafficPatternInfo-r16::=              SEQUENCE {
    trafficPeriodicity-r16                ENUMERATED {ms20, ms50, ms100,
ms200, ms300, ms400, ms500, ms600, ms700, ms800, ms900, ms1000},
    timingOffset-r16                   INTEGER (0..10239),
    messageSize-r16                    BIT STRING (SIZE (8)),
    sl-QoS-FlowIdentity-r16            SL-QoS-FlowIdentity-r16
}
-- TAG-UEASSISTANCEINFORMATION-STOP
-- ASN1STOP
```

TABLE 2

| UEAssistanceInformation field descriptions |
|---| affectedCarrierFreqList
　Indicates a list of NR carrier frequencies that are affected by IDC problem.
affectedCarrierFreqCombList
　Indicates a list of NR carrier frequency combinations that are affected by IDC problems due to Inter-Modulation Distortion and harmonics from NR when configured with UL CA.
delayBudgetReport
　Indicates the UE-preferred adjustment to connected mode DRX.
interferenceDirection
　Indicates the direction of IDC interference. Value nr indicates that only NR is victim of IDC interference, value other indicates that only another radio is victim of IDC interference and value both indicates that both NR and another radio are victims of IDC interference. The other radio refers to either the ISM radio or GNSS (see TR 36.816 [44]).
minSchedulingOffsetPreference
　Indicates the UE's preferences on minimumSchedulingOffset of cross-slot scheduling for power saving.
preferredDRX-InactivityTimer
　Indicates the UE's preferred DRX inactivity timer length for power saving. Value in ms (millisecond). ms0 corresponds to 0, ms1 corresponds to 1 ms, ms2 corresponds to 2 ms, and so on. If the field is absent from the DRX-Preference IE, it is interpreted as the UE having no preference for the DRX inactivity timer. If secondary DRX group is configured, the preferredDRX-InactivityTimer only applies to the default DRX group.
preferredDRX-LongCycle
　Indicates the UE's preferred long DRX cycle length for power saving. Value in ms. ms10 corresponds to 10ms, ms20 corresponds to 20 ms, ms32 corresponds to 32 ms, and so on. If preferredDRX-ShortCycle is provided, the value of preferredDRX-LongCycle shall be a multiple of the preferredDRX-ShortCycle value. If the field is absent from the DRX-Preference IE, it is interpreted as the UE having no preference for the long DRX cycle.
preferredDRX-ShortCycle
　Indicates the UE's preferred short DRX cycle length for power saving. Value in ms. ms2 corresponds to 2ms, ms3 corresponds to 3 ms, ms4 corresponds to 4 ms, and so on. If the field is absent from the DRX-Preference IE, it is interpreted as the UE having no preference for the short DRX cycle.
preferredDRX-ShortCycleTimer TABLE 2-continued UEAssistanceInformation field descriptions Indicates the UE's preferred short DRX cycle timer for power saving. Value in multiples of preferredDRX-ShortCycle. A value of 1 corresponds to preferredDRX-ShortCycle, a value of 2 corresponds to 2 * preferredDRX-ShortCycle and so on. If the field is absent from the DRX-Preference IE, it is interpreted as the UE having no preference for the short DRX cycle timer. A preference for the short DRX cycle is indicated when a preference for the short DRX cycle timer is indicated.

preferredK0
Indicates the UE's preferred value of k0 (slot offset between DCI and its scheduled PDSCH - see TS 38.214 [19], clause 5.1.2.1) for cross-slot scheduling for power saving. Value is defined for each subcarrier spacing (numerology) in units of slots. sl1 corresponds to 1 slot, sl2 corresponds to 2 slots, sl4 corresponds to 4 slots, and so on. If a value for a subcarrier spacing is absent, it is interpreted as the UE having no preference on k0 for cross-slot scheduling for that subcarrier spacing. If the field is absent from the MinSchedulingOffsetPreference IE, it is interpreted as the UE having no preference on k0 for cross-slot scheduling.

preferredK2
Indicates the UE's preferred value of k2 (slot offset between DCI and its scheduled PUSCH - see TS 38.214 [19], clause 6.1.2.1) for cross-slot scheduling for power saving. Value is defined for each subcarrier spacing (numerology) in units of slots. sl1 corresponds to 1 slot, sl2 corresponds to 2 slots, sl4 corresponds to 4 slots, and so on. If a value for a subcarrier spacing is absent, it is interpreted as the UE having no preference on k2 for cross-slot scheduling for that subcarrier spacing. If the field is absent from the MinSchedulingOffsetPreference IE, it is interpreted as the UE having no preference on k2 for cross-slot scheduling.

preferredRRC-State
Indicates the UE's preferred RRC state. The value idle is indicated if the UE prefers to be released from RRC_CONNECTED and transition to RRC_IDLE. The value inactive is indicated if the UE prefers to be released from RRC_CONNECTED and transition to RRC_INACTIVE. The value connected is indicated if the UE prefers to revert an earlier indication to leave RRC_CONNECTED state. The value outOfConnected is indicated if the UE prefers to be released from RRC_CONNECTED and has no preferred RRC state to transition to. The value connected can only be indicated if the UE is configured with connectedReporting.

reducedBW-FR1
Indicates the UE's preference on reduced configuration corresponding to the maximum aggregated bandwidth across all downlink carrier(s) and across all uplink carrier(s) of FR1, to address overheating or power saving. This field is allowed to be reported only when UE is configured with serving cell(s) operating on FR1. The aggregated bandwidth across all downlink carrier(s) of FR1 is the sum of bandwidth of active downlink BWP(s) across all activated downlink carrier(s) of FR1. The aggregated bandwidth across all uplink carrier(s) of FR1 is the sum of bandwidth of active uplink BWP(s) across all activated uplink carrier(s) of FR1. If the field is absent from the MaxBW-Preference IE or the OverheatingAssistance IE, it is interpreted as the UE having no preference on the maximum aggregated bandwidth of FR1.

When indicated to address overheating, this maximum aggregated bandwidth includes carrier(s) of FR1 of both the NR MCG and the SCG. This maximum aggregated bandwidth only includes carriers of FR1 of the SCG in (NG)EN-DC. Value mhz0 is not used when indicated to address overheating.

When indicated to address power saving, this maximum aggregated bandwidth includes carrier(s) of FR1 of the cell group that this UE assistance information is associated with. The aggregated bandwidth can only range up to the current active configuration when indicated to address power savings.

reducedBW-FR2
Indicates the UE's preference on reduced configuration corresponding to the maximum aggregated bandwidth across all downlink carrier(s) and across all uplink carrier(s) of FR2, to address overheating or power saving. This field is allowed to be reported only when UE is configured with serving cell(s) operating on FR2. The aggregated bandwidth across all downlink carrier(s) of FR2 is the sum of bandwidth of active downlink BWP(s) across all activated downlink carrier(s) of FR2. The aggregated bandwidth across all uplink carrier(s) of FR2 is the sum of bandwidth of active uplink BWP(s) across all activated uplink carrier(s) of FR2. If the field is absent from the MaxBW-Preference IE or the OverheatingAssistance IE, it is interpreted as the UE having no preference on the maximum aggregated bandwidth of FR2.

When indicated to address overheating, this maximum aggregated bandwidth includes carrier(s) of FR2 of both the NR MCG and the NR SCG. This maximum aggregated bandwidth only includes carriers of FR2 of the SCG in (NG)EN-DC.

When indicated to address power saving, this maximum aggregated bandwidth includes carrier(s) of FR2 of the cell group that this UE assistance information is associated with. The aggregated bandwidth can only range up to the current active configuration when indicated to address power savings.

TABLE 2-continued

UEAssistanceInformation field descriptions reducedCCsDL
    Indicates the UE's preference on reduced configuration corresponding to the maximum number of downlink SCells indicated by the field, to address overheating or power saving.
    When indicated to address overheating, this maximum number includes both SCells of the NR MCG and PSCell/SCells of the SCG. This maximum number only includes PSCell/SCells of the SCG in (NG)EN-DC.
    When indicated to address power saving, this maximum number includes PSCell/SCells of the cell group that this UE assistance information is associated with. The maximum number of downlink SCells can only range up to the current active configuration when indicated to address power savings.

reducedCCsUL
    Indicates the UE's preference on reduced configuration corresponding to the maximum number of uplink SCells indicated by the field, to address overheating or power saving.
    When indicated to address overheating, this maximum number includes both SCells of the NR MCG and PSCell/SCells of the SCG. This maximum number only includes PSCell/SCells of the SCG in (NG)EN-DC.
    When indicated to address power saving, this maximum number includes PSCell/SCells of the cell group that this UE assistance information is associated with. The maximum number of uplink SCells can only range up to the current active configuration when indicated to address power savings.

reducedMIMO-LayersFR1-DL
    Indicates the UE's preference on reduced configuration corresponding to the maximum number of downlink MIMO layers of each serving cell operating on FR1 indicated by the field, to address overheating or power saving. This field is allowed to be reported only when UE is configured with serving cells operating on FR1. The maximum number of downlink MIMO layers can only range up to the maximum number of MIMO layers configured across all activated downlink carrier(s) of FR1 in the cell group when indicated to address power savings.

reducedMIMO-LayersFR1-UL
    Indicates the UE's preference on reduced configuration corresponding to the maximum number of uplink MIMO layers of each serving cell operating on FR1 indicated by the field, to address overheating or power saving. This field is allowed to be reported only when UE is configured with serving cells operating on FR1. The maximum number of uplink MIMO layers can only range up to the maximum number of MIMO layers configured across all activated uplink carrier(s) of FR1 in the cell group when indicated to address power savings.

reducedMIMO-LayersFR2-DL
    Indicates the UE's preference on reduced configuration corresponding to the maximum number of downlink MIMO layers of each serving cell operating on FR2 indicated by the field, to address overheating or power saving. This field is allowed to be reported only when UE is configured with serving cells operating on FR2. The maximum number of downlink MIMO layers can only range up to the maximum number of MIMO layers configured across all activated downlink carrier(s) of FR2 in the cell group when indicated to address power savings.

reducedMIMO-LayersFR2-UL
    Indicates the UE's preference on reduced configuration corresponding to the maximum number of uplink MIMO layers of each serving cell operating on FR2 indicated by the field, to address overheating or power saving. This field is allowed to be reported only when UE is configured with serving cells operating on FR2. The maximum number of uplink MIMO layers can only range up to the maximum number of MIMO layers configured across all activated uplink carrier(s) of FR2 in the cell group when indicated to address power savings.

referenceTimeInfoPreference
    Indicates whether the UE prefers being provisioned with the timing information specified in the IE ReferenceTimeInfo.

sl-QoS-FlowIdentity
    This identity uniquely identifies one sidelink QoS flow between the UE and the network in the scope of UE, which is unique for different destination and cast type.

sl-UE-AssistanceInformationNR
    Indicates the traffic characteristic of sidelink logical channel(s), specified in the IE SL-TrafficPatternInfo, that are setup for NR sidelink communication.

type1
    Indicates the preferred amount of increment/decrement to the long DRX cycle length with respect to the current configuration. Value in number of milliseconds. Value ms40 corresponds to 40 milliseconds, msMinus40 corresponds to −40 milliseconds and so on.

victimSystemType
    Indicate the list of victim system types to which IDC interference is caused from NR when configured with UL CA. Value gps, glonass, bds, galileo and navIC indicates the type of GNSS. Value wlan indicates WLAN and value bluetooth indicates Bluetooth.

TABLE 2-continued

UEAssistanceInformation field descriptions

SL-TrafficPatternInfo field descriptions
messageSize
   Indicates the maximum TB size based on the observed traffic pattern. The value refers to the index of TS 38.321 [3], table 6.1.3.1-2.
timingOffset
   This field indicates the estimated timing for a packet arrival in a sidelink logical channel. Specifically, the value indicates the timing offset with respect to subframe#0 of SFN#0 in milliseconds.
trafficPeriodicity
   This field indicates the estimated data arrival periodicity in a sidelink logical channel. Value ms20 corresponds to 20 ms, ms50 corresponds to 50 ms and so on.

The CU node may receive the expected UE behavior information from the AMF. The CU node may receive the core network assistance information message from the AMF. The message may include the expected UE behavior information. The 'Expected UE Behaviour' of the 3GPP TS 38.413 standard may be used for reference to describe the expected UE behavior information. The IE may indicate a UE behavior having a mobility behavior and/or a predictable activity for supporting an NG-RAN node (e.g., determining of an optimal RRC connection time or an RRC_INACTIVE state transition and an RAN-based Notification Area (RNA) configuration (e.g., a size and shape of the RNA)).

The CU node may perform an E2 report service, based on at least one of the UE assistance information obtained from the UE and the expected UE behavior obtained from the AMF. According to an embodiment, the CU node may transmit UE context information and cell context information to the RIC. According to an embodiment, the CU node may transmit collected information (e.g., at least one of the UE assistance information and the expected UE behavior obtained from the AMF) to the RIC.

Figure 8:
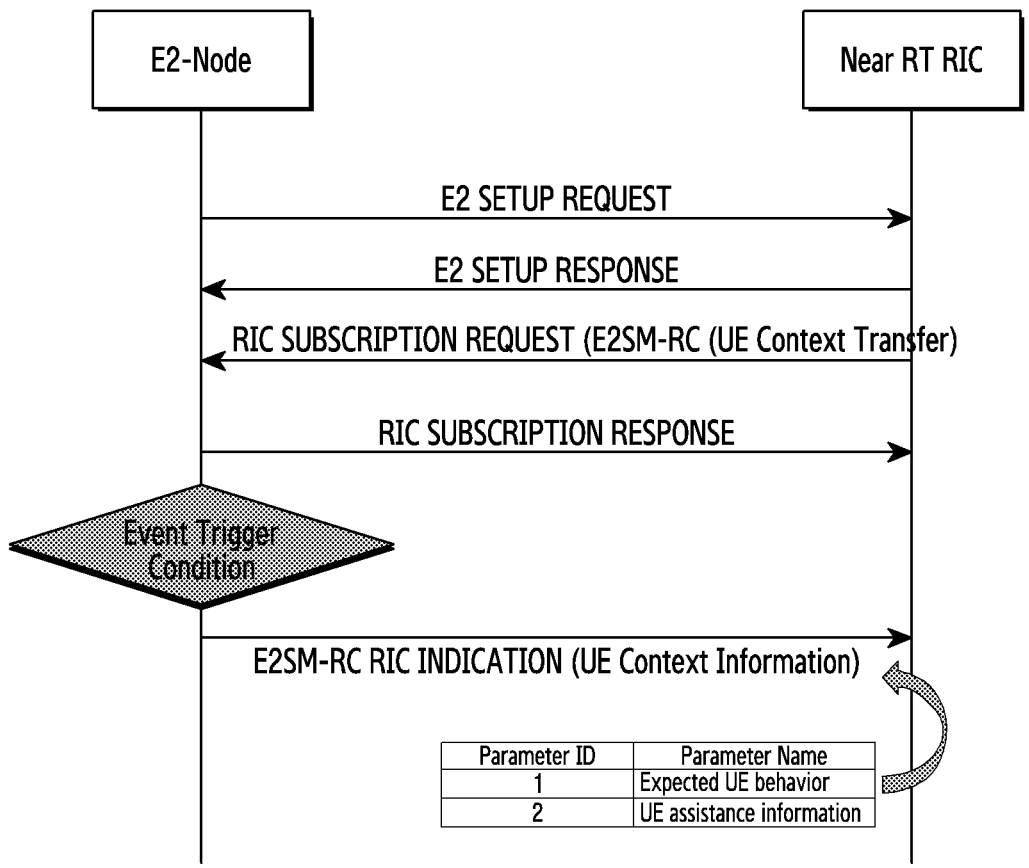
FIG. 8 illustrates signaling for sharing expected UE behavior and UE assistance information out of UE context information between an E2 node and an RIC according to an embodiment of the disclosure.

FIG. 8 illustrates signaling for sharing expected UE behavior and UE assistance information out of UE context

TABLE 3

| IE/Group Name | Presence | Range | IE type and reference | Semantics description |
|---|---|---|---|---|
| Expected UE Activity Behaviour | O | | 9.3.1.94 | |
| Expected HO Interval | O | | ENUMERATED (sec 15, sec 30, sec 60, sec 90, sec 120, sec 180, long-time, . . .) | Indicates the expected time interval between inter NG-RAN node handovers. If "long-time" is included, the interval between inter NG-RAN node handovers is expected to be longer than 180 seconds. |
| Expected UE Mobility | O | | ENUMERATED (stationary, mobile, . . .) | Indicates whether the UE is expected to be stationary or mobile. |
| Expected UE Moving Trajectory | | 0 . . . 1 | | Indicates the UE's expected geographical movement. |
| >Expected UE Moving Trajectory Item | | 1 . . . <maxnoofCells UEMovingTrajectory> | | Includes list of visited and non-visited cells, where visited cells are listed in the order the UE visited them with the most recent cell being the first in the list. Non-visited cells are included immediately after the visited cell they are associated with. |
| >>NG-RAN CGI | M | | 9.3.1.73 | |
| >>Time Stayed in Cell | O | | INTEGER (0 . . . 4095) | Included for visited cells and indicates the time a UE stayed in a cell in seconds. If the UE stays in a cell more than 4095 seconds, this IE is set to 4095. | information between an E2 node and an RIC according to an embodiment of the disclosure.

Referring to FIG. 8, the E2 node may be an O-CU. Although a set-up procedure, an RIC subscription procedure, an RIC indication message transmission procedure, and an RIC control message transmission procedure (not shown) are described sequentially, embodiments of the disclosure are not limited to the aforementioned order and procedure. In some embodiments of the disclosure, the E2 node and the RIC may independently perform the E2 set-up procedure. In some embodiments of the disclosure, the E2 node and the RIC may independently perform the subscription procedure. According to another embodiment of the disclosure, as described above, the E2 set-up response message may include a subscription request message. In some embodiments, the E2 node and the RIC may independently perform the RIC indication procedure.

The E2 node may transfer UE context information by using an RIC indication message defined in an E2SM RAN control, based on a UE context transfer event trigger condition configured by the RIC. The UE context information includes at least one of the following information, but is not limited to such UE information:

Expected UE Behavior
UE assistance information

The expected UE behavior information is a message received by a gNB from an AMF, and is received by the gNB through NG interface messages described below. The expected UE behavior information may be expected HO interval information, expected UE mobility information, expected UE moving trajectory information (NG-RAN CGI, Time Stayed in Cell) specified in in 3GPP TS 38.413. For example, information in Table 3 above may be used for reference.

The expected HO interval information indicates an expected time interval between inter NG-RAN node handovers. When a 'long time' is included, an interval between the inter NG-RAN node handovers may be expected to be longer than or equal to 180 seconds.

The expected UE mobility information indicates whether the UE is in a stationary state or a mobile state.

The expected UE moving trajectory information (e.g., up to 16 elements) indicates a UE's expected geographical movement. The expected UE moving trajectory information may include a list of visited cells and unvisited cells. In the list, the visited cells are enumerated in an order by which the cells are visited by the UE, and a most recent cell may be first in the list. The unvisited cell may be included immediately after an associated visited cell. In addition, the expected UE moving trajectory information may be included with respect to the visited cell, and may include information indicating a time (seconds) for which the UE stays in a cell. For example, when the UE stays in the cell for x seconds (x is an integer less than or equal to 4095), an IE may be set to x. In addition, when the UE stays in the cell for at least 4095 seconds, the IE may be set to 4095.

According to an embodiment, the expected UE behavior or the UE assistance information may be transferred from the E2 node (e.g., gNB or gNB-CU) to the RIC through the E2SM-RC RIC indication. Which information is transferred to the RIC may be indicated by setting a value of a parameter ID. For example, when the parameter ID is 7, information included in a corresponding parameter may be the expected UE behavior information. In addition, for example, when the parameter ID is 8, the information included in the corresponding parameter may be the UE assistance information.

Figure 9:
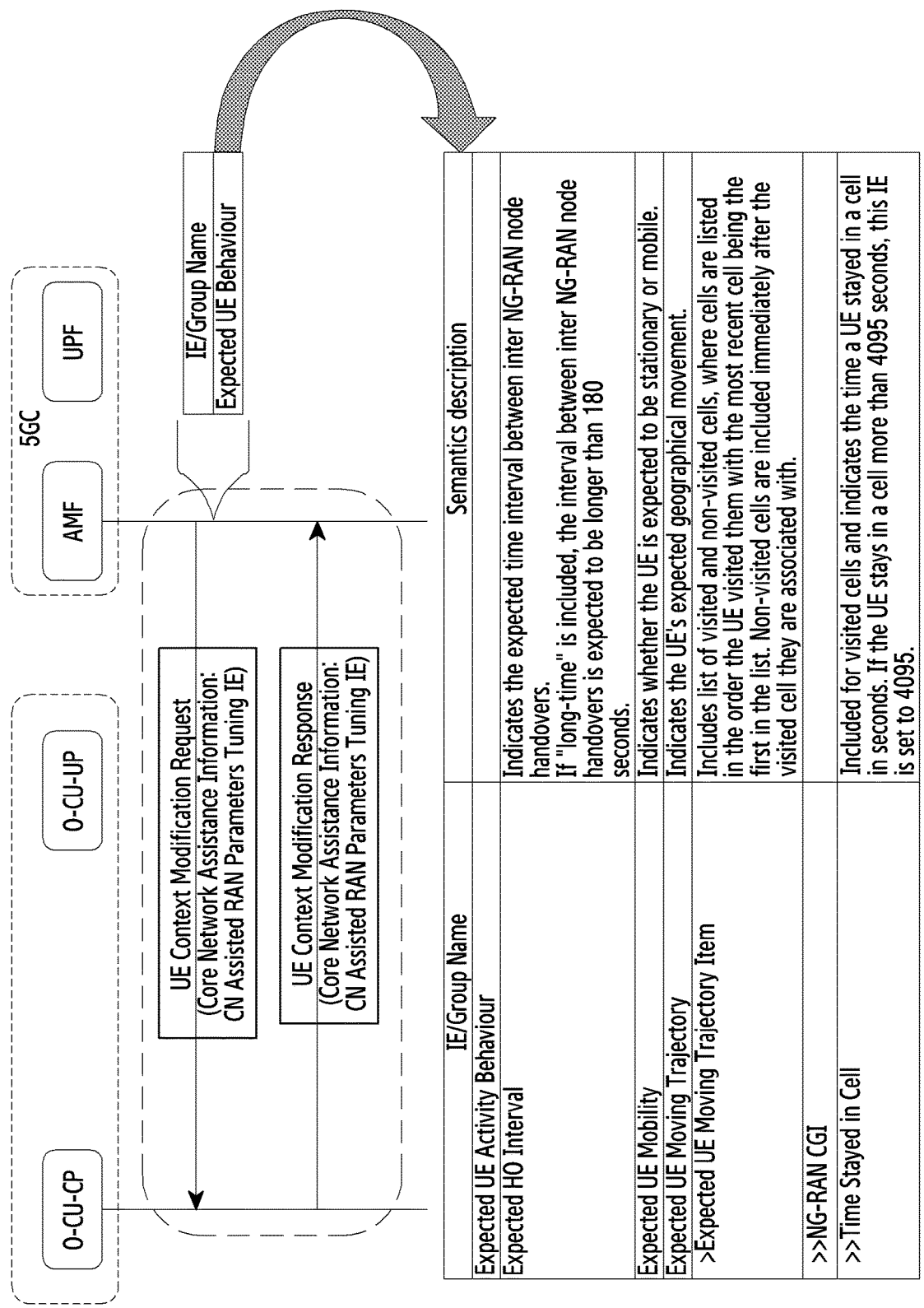
FIG. 9 illustrates an example of information transfer in which an AMF transfers a core network assistance information Information Element (IE) to an O-CU-CP through an Next Generation Application Protocol (NGAP) UE context modification request message according to an embodiment of the disclosure.

FIG. 9 illustrates an example of information transfer in which an AMF transfers a core network assistance information IE to an O-CU-CP through an Next Generation Application Protocol (NGAP) UE context modification request message according to an embodiment of the disclosure.

Referring to FIG. 9, the AMF may provide the core network assistance information IE to an NG-RAN node to support a decision of the NG-RAN node about whether a UE is able to perform transmission in an RRC_INACTIVE state. For example, the core network assistance information IE may include the following information.

Registration region configured for the UE
Periodic registration update timer
UE identity index value and UE specific discontinuous reception (DRX)
Indicate whether the UE is configured with a Mobile Initiated Connection Only (MICO) mode by the AMF
The expected UE behavior The UE registration region may be considered in the NG-RAN node when an RNA is configured. For RAN paging, the UE specific DRX and the UE identity index value may be used by the NG-RAN node. The periodic registration update timer may be considered in the NG-RAN node to configure a periodic RNA update timer. The NG-RAN node may consider an expected UE behavior to facilitate a decision to a UE RRC state transition.

The core network assistance information IE may be configured as follows:

TABLE 4

| IE/GroupName | Presence | Range | IE type and reference | Semantics description |
|---|---|---|---|---|
| UE Identity Index Value | M | | 9.3.3.23 | |
| UE Specific DRX | O | | PagingDRX 9.3.1.90 | |
| Periodic Registration Update Timer | M | | 9.3.3.24 | |
| MICO Mode Indication | O | | 9.3.1.23 | |
| TAI List for RRC Inactive | | 1 | | |
| > TAI List for RRC Inactive Item | | 1 ... | <masnoofTAIforInactive> | |

TABLE 4-continued

| IE/GroupName | Presence | Range | IE type and reference | Semantics description |
|---|---|---|---|---|
| >> TAI | M | | 9.3.3.11 | |
| Expected UE Behaviour | O | | 9.3.1.93 | |

TABLE 5

| Rangebound | Explanation |
|---|---|
| maxnoofTAIforInactive | Maximum no. of TAIs for RRC Inactive. Value is 16. |

The UE identity index may be configured as follows:

TABLE 6

| IE/GroupName | Presence | Range | IE type and reference | Semantics description |
|---|---|---|---|---|
| CHOICE UE Identity Index Value | | | | |
| >Index Length 10 | | | | |
| >>Index Length 10 | M | | BIT STRING (SIZE(10)) | Coded as specified in TS 38.304 [12] and TS 36.304 [29] |

The periodic registration update timer may be configured as follows:

TABLE 7

| IE/GroupName | Presence | Range | IE type and reference | Semantics description |
|---|---|---|---|---|
| Periodic Registration Update Timer | M | | BIT STRING (SIZE(8)) | Bits 5 to 1 represent the binary coded timer value. Bits 6 to 8 define the timer value unit for the Periodic Registration Update Timer as follows: Bits 876 000 value is incremented in multiples of 10 minutes 001 value is incremented in multiples of 1 hour 010 value is incremented in multiples of 10 hours 011 value is incremented in multiples of 2 seconds 100 value is incremented in multiples of 30 seconds 101 value is incremented in multiples of 1 minute 111 value indicates that the timer is deactivated. Other values shall be interpreted as multiples of 1 hour in this version of the protocol. | information IE is used to transfer expected UE activity behavior information. Expected HO interval information, expected UE mobility information, and expected UE moving trajectory information may be included inside the expected UE activity behavior. The expected UE moving trajectory information enumerates information on a cell in which the UE stayed in the past and the UE's stay time information. For example, Table 3 may be used for reference as the expected UE behavior.

Although the UE context modification procedure is exemplified in FIG. 9, the procedure is for exemplary purposes only, and the expected UE behavior according to embodiments of the disclosure may also be used in other procedures. For example, an N2 message between the AMF and the NG-RAN node (e.g., gNB), in which the expected UE behavior is included, may use a message of the following procedures.

1) Initial Context Setup (Request/Response)
2) UE context Modification (Request/Response)
3) Handover resource allocation (Handover Request/ACK)
4) Path Switch (Request/ACK)

Although the core network assistance information is exemplified in FIG. 9, the expected UE behavior may be Referring to FIG. 9, the AMF may transmit a UE context modification request message to a CU node (e.g., an O-CU-CP). The CU node may transmit a UE context modification response message to the AMF. The core network assistance transferred through an IE of "CN Assisted RAN Parameters Tuning". The IE may be used to assist parameter tuning in the NG-RAN node. For example, the CN assisted RAN parameters tuning IE may be configured as follows.

TABLE 8

| IE/GroupName | Presence | Range | IE type and reference | Semantics description |
|---|---|---|---|---|
| Expected UE Behaviour | O | | 9.3.1.93 | This IE may be present in case the Core Network Assistance Information for RRC INACTIVE IE is not included and is ignored otherwise. |

Figure 10:
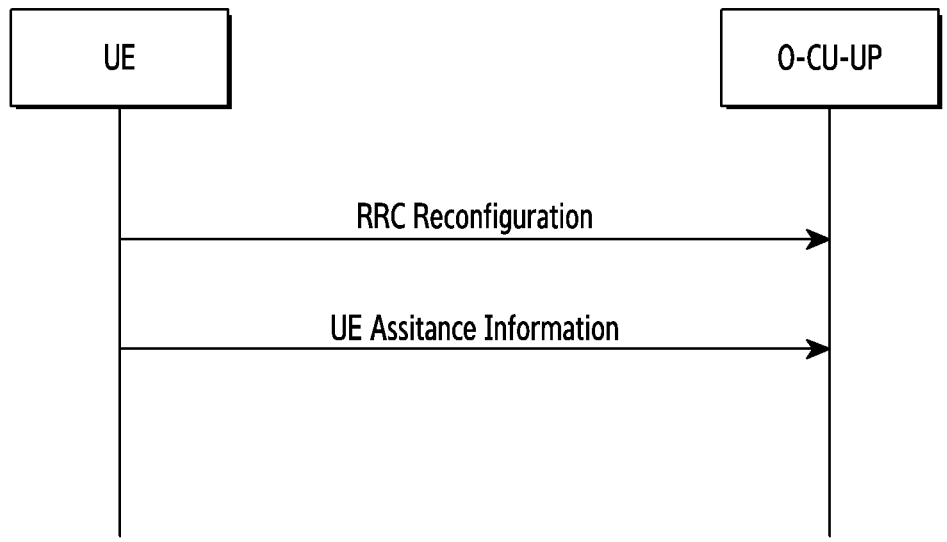
FIG. 10 illustrates an example of information transfer in which a UE transfers information to an O-CU-CP through an RRC message of UEAssistanceInformation IE according to an embodiment of the disclosure.

FIG. 10 illustrates an example of information transfer in which a UE transfers information to an O-CU-CP through an RRC message of UEAssistanceInformation IE according to an embodiment of the disclosure.

Referring to FIG. 10, a base station (e.g., gNB, gNB-CU, CU-CP) may perform RRC reconfiguration with respect to a terminal (e.g., UE). Thereafter, the UE may transmit a UEAssistanceInformation message to the base station. The UEAssistanceInformation may include UEAssistanceInformation-IEs. Specifically, Tables 1 and 2 may be used for reference.

UE information of the UE assistance information corresponds to the UE's configuration preference option or current state information. The UE assistance information may include DelayBudgetReport. The DelayBudgetReport means UE preference option information for adjustment of a Connected mode DRX (C-DRX) cycle. The UE assistance information may include OverheatingAssistance: UE preference option information regarding whether UE heating occurs and regarding a control when heated.

Figure 11:
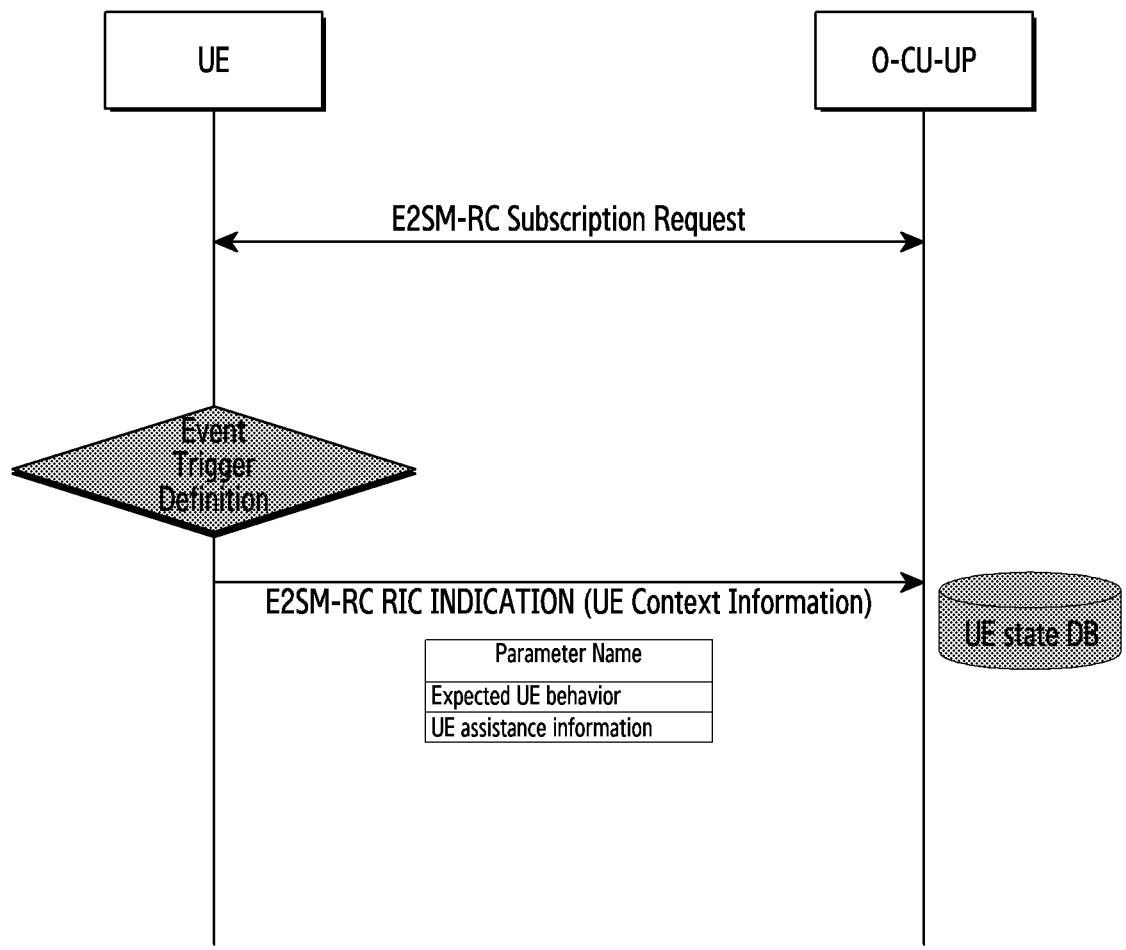
FIG. 11 illustrates a subscription procedure and RIC indication signaling between an E2 node and an RIC according to an embodiment of the disclosure.

FIG. 11 illustrates a subscription procedure and RIC indication signaling between an E2 node and an RIC according to an embodiment of the disclosure. FIG. 11 illustrates a subscription procedure and RIC indication (report) procedure between an E2 node and an RIC according to an embodiment of the disclosure.

Referring to FIG. 11, the RIC may transmit an RIC subscription request message to an E2 node. The E2 node may be an O-CU-CP, an O-CU-UP, or an O-CU-DU. The E2 node may transmit an RIC subscription response message to the RIC. The E2 node installs Event TriggerDefinition defined in the RIC subscription request message.

When a determined event defined in the TriggerDefinition occurs, the E2 node may transmit an RIC indication message to a near-RT RIC. Each E2 node may identify an event configured to the E2 node through a subscription procedure. The RIC indication message may include expected UE behavior information. In addition, the RIC indication message may include UE assistance information. In a message format of the RIC indication message, a value of a parameter ID in parameter lists included in an indication message format may indicate the expected UE behavior or the UE assistance information. The expected UE behavior or UE assistance information corresponding to the value of the parameter ID may be included in the RIC indication message. The information may be included therein by referring to a 3GPP TS 38.331 (in case of UE assistance information) or 3GPP TS 38.413 (in case of Expected UE Behavior) standard.

Figure 12:
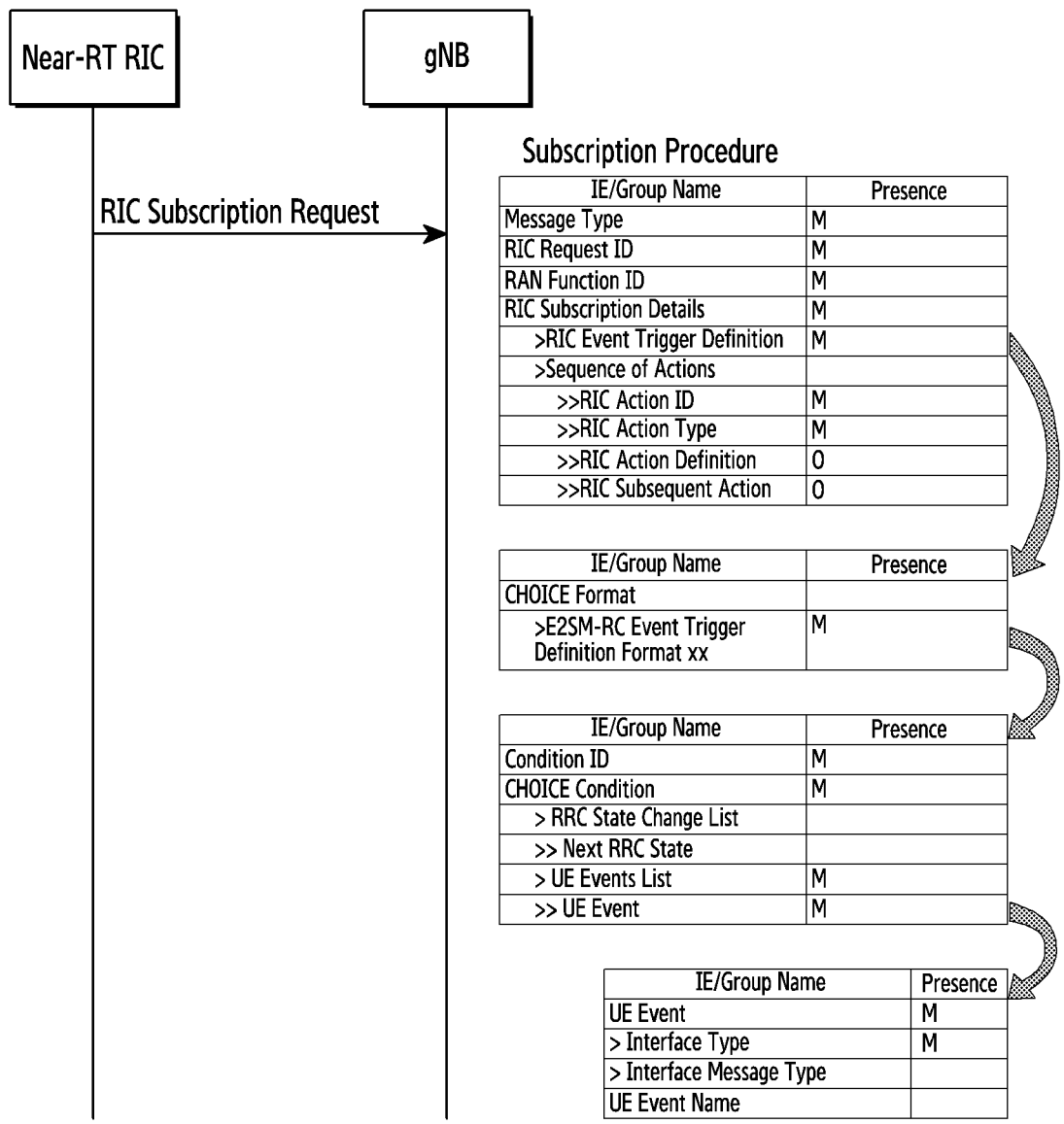
FIG. 12 illustrates an example of a format of an RIC event trigger definition according to an embodiment of the disclosure.

FIG. 12 illustrates an example of a format of an RIC event trigger definition according to an embodiment of the disclosure. FIG. 12 describes an example of an RIC subscription request procedure and message according to embodiments of the disclosure.

Referring to FIG. 12, a near-RT RIC may transmit an RIC subscription request message to a base station (e.g., gNB).

The RIC subscription request message may include a message type, an RIC request ID, an RAN function ID, and RIC subscription details.

Information on the RIC subscription details may include an RIC event trigger definition. An RIC event trigger definition format in an RIC subscription request message specified in the O-RAN standard is illustrated in FIG. 12. The RIC event trigger definition may be defined according to each RIC and a service model supported in the RAN. Embodiments of the disclosure propose a procedure of selecting UE assistance information and expected UE behavior information satisfying a triggering condition among a plurality of pieces of UE context-related information which varies depending on a UE state of the RAN.

A message type of the subscription message is a type number specified in a standard according to each message type. The RIC request ID is an ID used by the RIC to uniquely manage a corresponding message. The RAN function ID is an ID used by the E2 node to identify a function to be controlled. The RIC event trigger definition IE is defined in detail in a message in the format of an event trigger definition format defined in a service model in detail for the message. Although an IE for the event trigger definition format is exemplified as E2SM-RC event trigger definition format 1 in the disclosure, the term 'IE' may vary depending on the service model.

The event trigger definition format 1 indicates a condition list for designating an IE of a specific event. Although the IE is exemplified in the disclosure as shown in a UE event Table 9 described below, the term 'IE' may vary depending on the service model. The UE ID triggering condition is defined as a UE event among condition values (RRC state change list, UE events list) defined in a choice condition designating a condition. In the disclosure, in the UE event, an interface type specifies a network interface in which a related event occurs, and a message type is defined as the expected UE behavior and UE assistance information specified in the 3GPP standard. The UE event name is a name of an event in which a message type occurs for each interface type.

TABLE 9

| Interface Type | Message Type | UE Event Name |
|---|---|---|
| NGAP | Expected UE Behavior | Expected UE Behavior |
| RRC | UE Assistance Information | UE Assistance Information |

Figure 13:
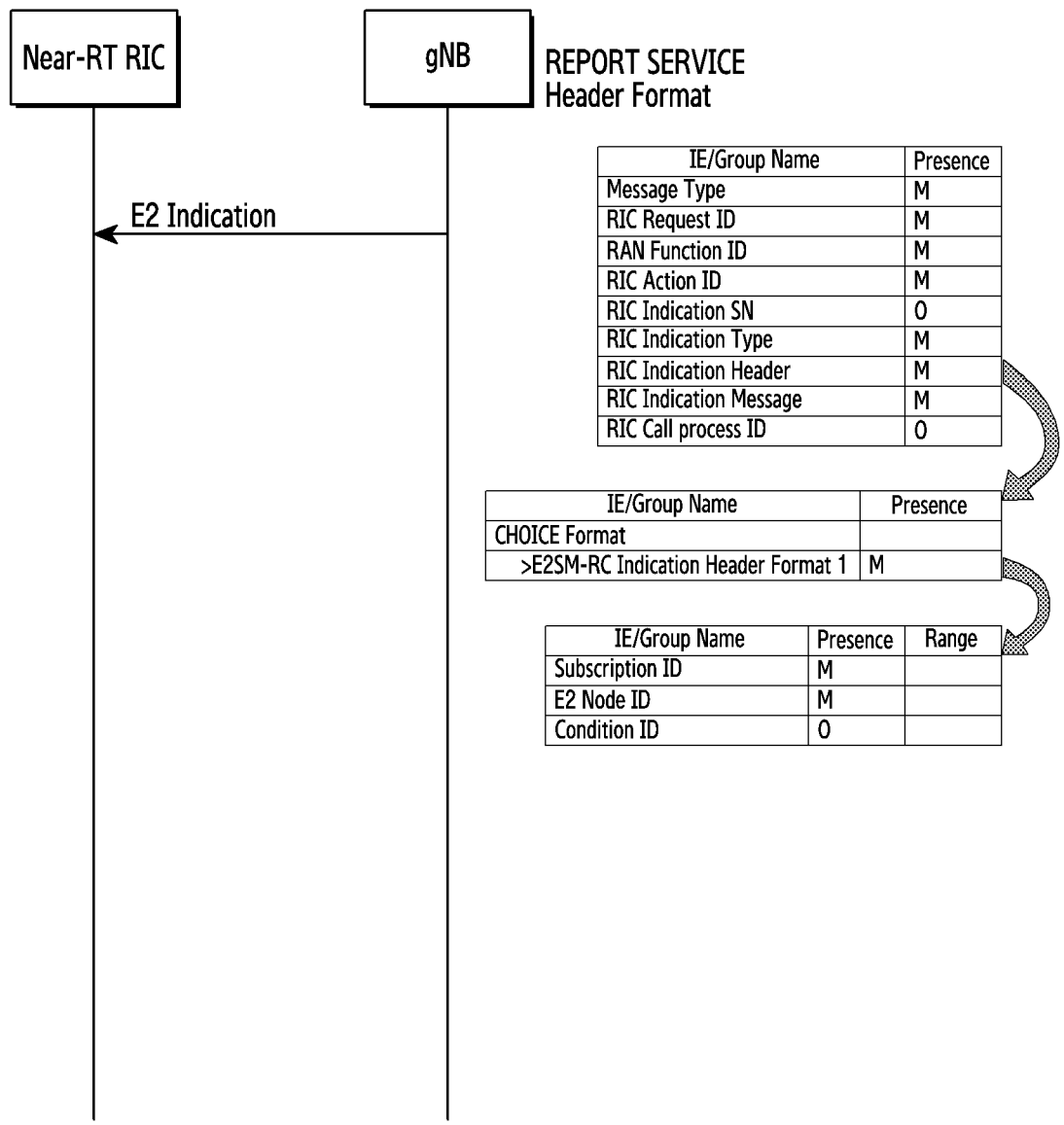
FIG. 13 illustrates an example of a format of an RIC indication header according to an embodiment of the disclosure.

FIG. 13 illustrates an example of a format of an RIC indication header according to an embodiment of the disclosure. An example of an RIC indication header message in an RIC report service (RIC indication) procedure is described according to embodiments of the disclosure with reference to FIG. 13.

Referring to FIG. 13, a base station (e.g., gNB) may transmit an E2 RIC indication message to a near-RT RIC. An RIC indication message specified in an O-RAN standard may include RIC indication header information. The RIC indication message may differ for each E2 service model, and may be defined for each E2 service model. The RIC indication header may include an E2SM indication header format defined as a detailed message in the service model. The RIC indication header according to embodiments of the disclosure may be defined as an indicator header format 1 of an E2SM-RC report service. The indication header format 1 of the detailed E2SM-RC report service may include a subscription ID specifying a specific subscription, an ID of the E2 node, and a condition ID. The condition ID specifies a condition when a specific condition is optionally used.

Figure 14:
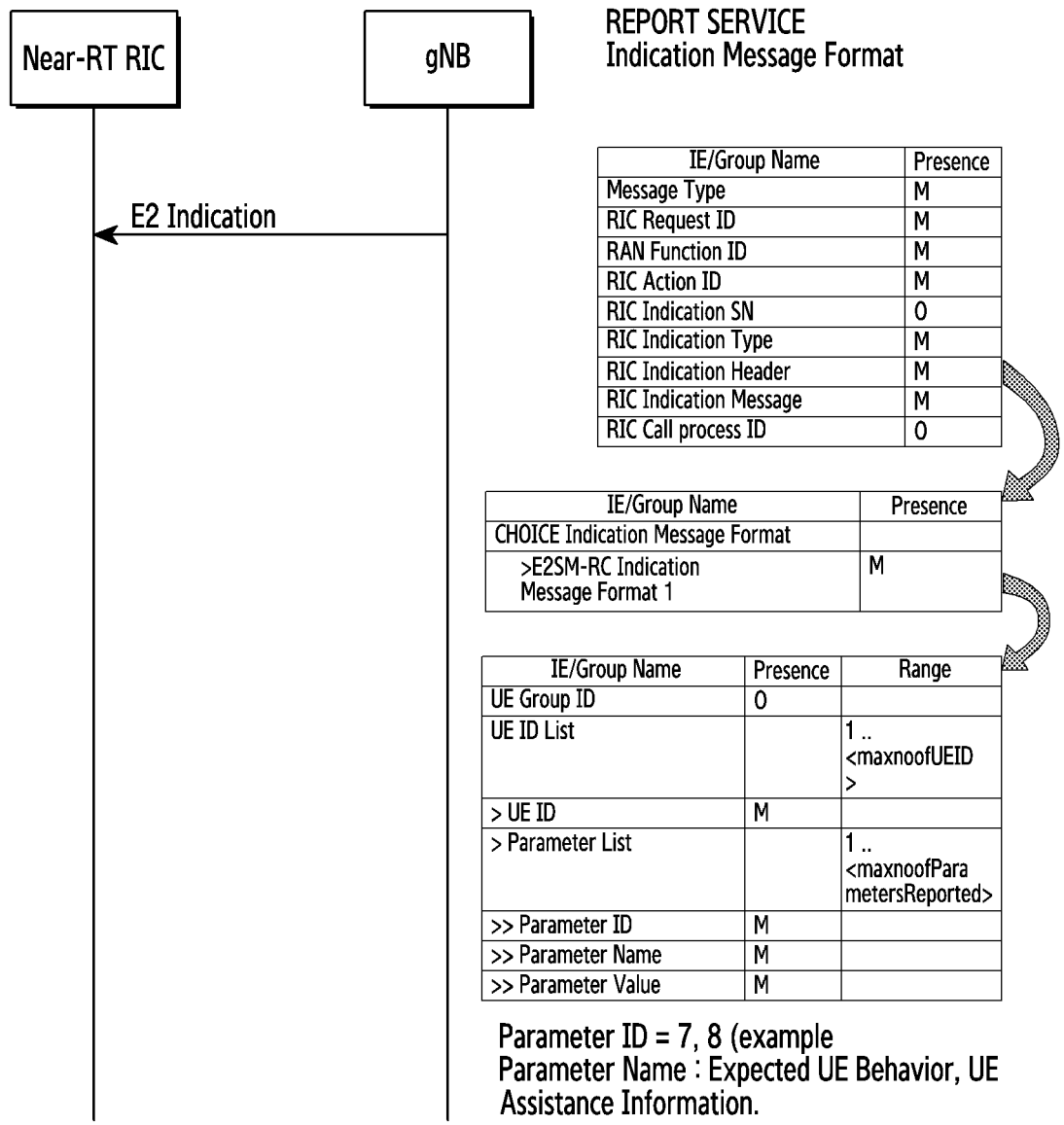
FIG. 14 illustrates examples of a format of an RIC indication message according to an embodiment of the disclosure.

FIG. 14 illustrates examples of a format of an RIC indication message according to an embodiment of the disclosure.

Referring to FIG. 14, the E2 indication message may include a message type, an RIC request ID, an RIC function ID, an RIC action ID, an RIC indication SN (optional), an RIC indication type, an RIC indication header, an RIC indication message, and an RIC call process ID (optional). The RIC Indication message includes a UE group ID, a UE ID, and a parameter list according to an E2SM-RC report service indication format. The parameter list may include one or more sets. Each set is defined as a parameter ID, a parameter name, and a parameter value. The set may include an expected UE behavior parameter ID and UE assistance information IE defined in the disclosure. The expected UE behavior parameter ID and the UE assistance information IE may be defined as shown in Table 10 below.

Time Stayed in Cell: A stay time for each visited cell.

The near-RT RIC may configure an RAN by predicting a UE mobility, based on the expected UE behavior information by which machine learning is performed by the AI/ML host. For example, the near-RT RIC may configure a Tracking Area Code (TAC), and may perform an operation of configuring as a narrow TAC when the UE is the stationary UE and configuring as a wide RAC when the UE is the mobile UE.

The near-RT RIC may configure an RAN, based on the UE assistance information. In case of OverheatingAssistance, the near-RT RIC may indicate a control method when a UE is heated, based on UE preference option information regarding whether UE heating occurs and regarding a control when heated. For example, the near-RT RIC may control a carrier aggregation carrier component, based on reducedMaxCCs supported by the UE.

When a procedure of configuring and controlling a parameter between the UE and the base station (RAN) is performed through probability, there was a problem in that efficiency is low to some extent. Accordingly, embodiments of the disclosure are not limited to one RAN. Explicit UE information and previous histories may be collected from a plurality of RANs through the RIC of the O-RAN which is an open platform, thereby maximizing efficiency through AI learning based on big data.

As exemplified in FIG. 15, a framework between the E2 node and the RIC may be summarized as follows.

1) The E2 node (e.g., gNB, gNB-CU, gNB-CU-CP) transmits collected information (e.g., UE expected behavior information, UE assistance information) to the RIC.

TABLE 10

| Parameter ID | Parameter Name | Parameter Type | Parameter Definition | Parameter Description |
|---|---|---|---|---|
| 1 | O-RAN UE ID | OCTET STRING | O-RAN UE ID structure as per <ref> | Call Setup, Release and Modify Event' |
| ... | ... | ... | ... | ... |
| 7 | Expected UE behavior | OCTET STRING | Expected UE Behavior IE in TS 38.4139.3.1.93 | |
| 8 | UE assistance information | OCTET STRING | UE Assistance Information TS 38.331 | |

Figure 15:
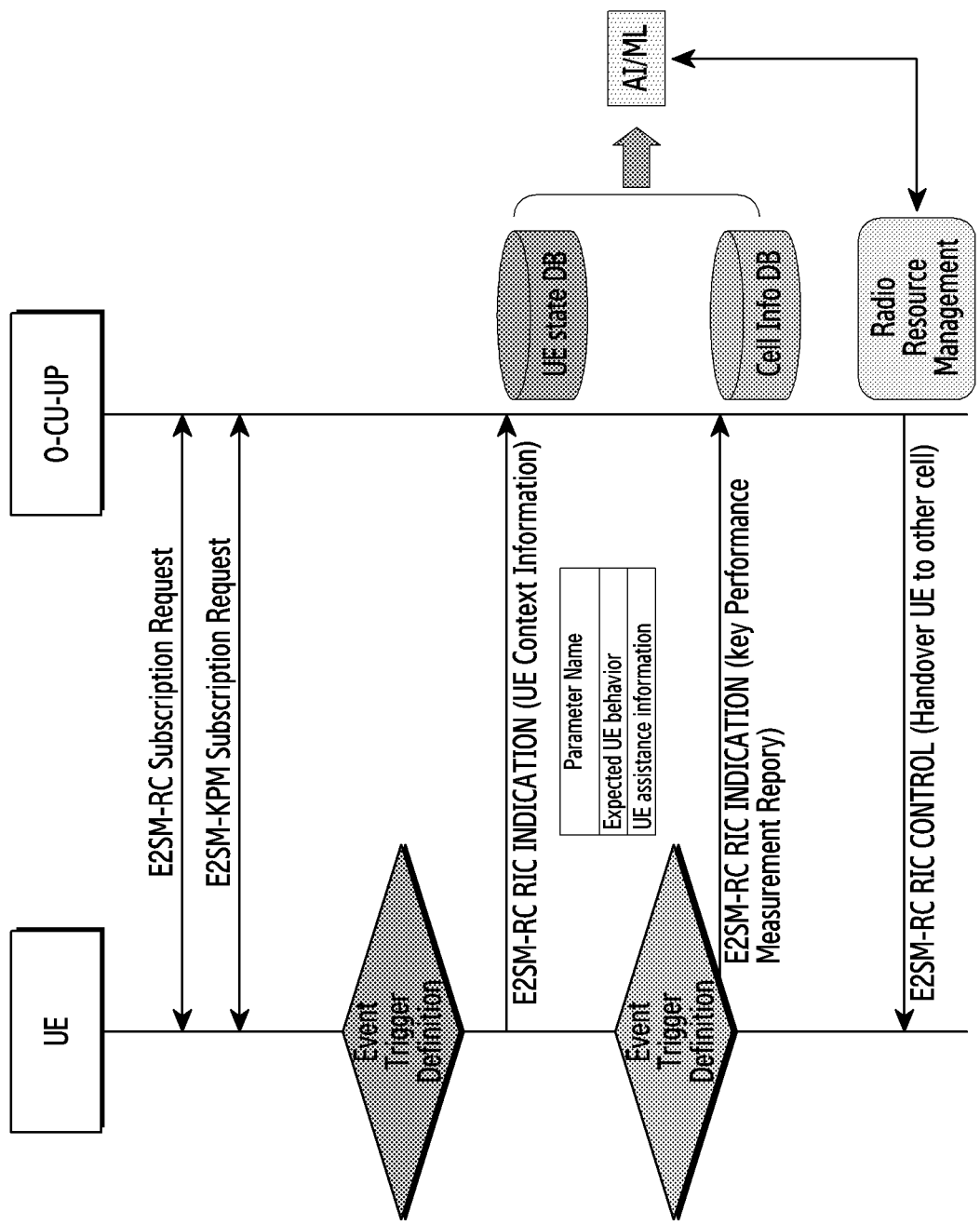
FIG. 15 illustrates an example of a procedure in which E2SM-RC and E2SM-KPM services are performed together according to an embodiment of the disclosure.

FIG. 15 illustrates an example of a procedure in which E2SM-RC and E2SM-KPM services are performed together according to an embodiment of the disclosure.

An example is illustrated with reference to FIG. 15 in which the expected UE behavior and the UE assistance information are applied to AI/ML by being applied to an indication format when E2SM-RC and E2SM-KPM service models are applied. The expected UE behavior information and UE assistance information transferred through an RIC indication message may be stored in a UE state DB. The stored information may be managed for each specific UE ID, so that machine learning is performed by an AI/ML host. The expected UE behavior information is as follows.

The UE behavior corresponds to expected UE behavior (mobility feature).

Expected HO Interval: An expected time interval between inter NG-RAN node handovers.

Expected UE Mobility: An indication for estimating whether a UE is a stationary UE or a mobile UE.

Expected UE Moving Trajectory: Is information on a previously visited cell and a non-visited cell (a first cell in a list is a most recently visited cell).

2) The RIC processes information for each UE or UE group through the collected information (e.g., a category classification such as a UE vendor, a model (type), an RFSP, a slice, etc.).

3) The RIC provides a control or configuration optimized to a corresponding UE (or UE group) (selection of a parameter or an algorithm option).

4) The RIC transmits a configuration command (or recommendation) message and a control parameter for the RAN.

5) The E2 node obtains a result of performing an operation in the RAN, and feeds back the result to the RIC.

6) The RIC corrects and updates a database policy and an AI learning result, based on a feedback result. The RIC applies a correction and update result to a control/command/recommendation at a later time.

When the UE expected behavior is utilized, the RIC and gNB (or gNB-DU, gNB-CU-CP) may operate as follows.

Step 1) UE information corresponds to the expected UE behavior (mobility feature).

Expected HO Interval: An expected time interval between inter NG-RAN node handovers.

Expected UE Mobility: An indication for estimating whether a UE is a stationary UE or a mobile UE.

Expected UE Moving Trajectory: Information on a previously visited cell and a non-visited cell (a first cell in a list is a most recently visited cell).

>>Time Stayed in Cell: A stay time for each visited cell.

Step 3) The RIC recognizes a UE mobility feature from the UE information of the step 1.

An example of an RIC-to-RAN configuration is as follows.

1) TAC: Tracking Area Code:

A UE in an RRC_Idle state may receive CN paging while performing idle mobility (TA update). In general, a TAC configuration has a tradeoff relation as follows.

[1] Although a wide TAC decreases a TA update frequency, paging shall be broadcast to more cells when CN paging is performed (a network CN/gNB paging load increases).

[2] Although a narrow TAC increases the TA update frequency, paging may be broadcast to less cells when CN paging is performed (a network CN/gNB paging load decreases).

The RIC may configure an RAN according to the expected UE behavior (mobility feature). The RIC may configure the narrow TAC in case of a stationary UE, and may configure the wide TAC in case of a mobile UE (or may provide control to determine the number of cells in the same TAC).

Even if the TAC has the same width, the RIC may control a cell configuration of the TAC with the expected UE moving trajectory information of the UE. For example, it is assumed that the TAC consists of 6 cells (a random TAC configuration: consisting of Cell 1/2/3/4/5/6). In this case, since the TAC configuration does not match the moving trajectory of the UE, an TA update may occur frequently. The RIC may construct the TAC, based on the expected UE moving trajectory (e.g., cell 1/11/21/31/41/51/61). Since the moving trajectory of the UE and the TAC configuration match well, the TA update may occur less frequently.

The aforementioned examples may be applied individually to a specific UE, and the RIC function may include an operation of applying the examples by performing AI learning through information processing (classified into a category such as a UE vendor, a model (type), an RFSP, a slice, or the like) for each UE or UE group. Meanwhile, when all UEs in the cell are affected by a geographical feature or a road (a bus route, a subway), or the like, a method of applying the examples commonly to all UEs may also be understood as an embodiment of the disclosure.

2) RNA: RAN Notification Area

A UE in an RRC_Inactive state may receive RAN paging while performing idle mobility (RNA update). In general, an RAN configuration has a tradeoff relation as follows.

[1] Although a wide RNA decreases an RNA update frequency, paging shall be broadcast to more cells when RAN paging is performed (a network gNB paging load increases).

[2] Although a narrow RNA increases the RNA update frequency, paging may be broadcast to less cells when RAN paging is performed (a network gNB paging load decreases).

The RIC may configure an RAN according to the expected UE behavior (mobility feature) of the UE. The RIC may configure the narrow RNA in case of a stationary UE, and may configure the wide RNA in case of a mobile UE (or may provide control to determine the number of cells in the same RNA).

Even if the RNA has the same width, the RIC may control a cell configuration of the RNA with the expected UE moving trajectory information of the UE.

For example, it is assumed that the RNA consists of 6 cells (a random RNA configuration: consisting of Cell 1/2/3/4/5/6). Since the RNA configuration does not match the moving trajectory of the UE, an RNA update may occur frequently. The RIC may construct the RNA, based on the expected UE moving trajectory (e.g., cell 1/11/21/31/41/51/61). In this case, since the RIC matches the moving trajectory of the UE at a relatively high rate, the RNA update may occur less frequently than before.

The aforementioned examples may be applied individually to a specific UE, and the RIC function may include an operation of applying the examples by performing AI learning through information processing (classified into a category such as a UE vendor, a model (type), an RFSP, a slice, or the like) for each UE or UE group. Meanwhile, when all UEs in the cell are affected by a geographical feature or a road (a bus route, a subway), or the like, a method of applying the examples commonly to all UEs may also be understood as an embodiment of the disclosure.

3) Connected Mobility: Target Frequency of Measurement Object

A UE in an RRC_CONNECTED state may perform measurement according to a measurement configuration, and may report a measurement result. An RIC may obtain information in advance, such as target cell information, measurement cell information, and black cell information depending on a UE mobility, through UE information. The RIC may provide a measurement configuration suitable for the UE, based on a target cell ID, measurement object target cell ID, and black cell ID of mobility information. Utilization and efficiency of measurement reporting may be increased in an RAN by providing a more accurate measurement configuration.

The aforementioned procedures may be repeated by the RIC to perform machine learning and update a result, thereby providing an RAN configuration more conforming to an operation of a UE (or UE group) in practice.

The UE assistance information may correspond to UE's configuration preference option or current state information.

DelayBudgetReport: UE preference option information for adjustment of a C-DRX cycle OverheatingAssistance: UE preference option information regarding whether UE heating occurs and regarding a control when heated : reducedMaxCCs (for each of DL and UL)
reducedMaxBW-FR1
reducedMaxBW-FR2
reducedMaxMIMO-LayersFR1 (for each of DL and UL)
reducedMaxMIMO-LayersFR2 (for each of DL and UL)
IDC-Assistance
DRX-Preference
MaxBW-Preference
MaxCC-Preference
MaxMIMO-LayerPreference
MinSchedulingOffsetPreference
ReleasePreference: UE preference option information (RRC Idle, RRC connected) in case of RRC release
SL-UE-AssistanceInformationNR
referenceTimeInfoPreference.

The RIC may recognize configuration preference option or current state information from the UE assistance information.

An example of RIC-to-RAN configuration is as follows.

OverheatingAssistance: UE preference option information regarding whether UE heating occurs and regarding a control when heated
: reducedMaxCCs (for each of DL and UL)
reducedMaxBW-FR1
reducedMaxBW-FR2
reducedMaxMIMO-LayersFR1 (for each of DL and UL)
reducedMaxMIMO-LayersFR2 (for each of DL and UL)

According to the UE assistance information, the RIC may instruct the RAN (eNB) to perform a control method when the UE is heated. For example, when information of reducedMaxCCs (4 DL CCs, 2 UL CCs) is valid, the RIC may perform an option configured in the UE, for example, in which 4 DL CCs and 6 UL CCs are deactivated among 8 NR CA CCs currently configured (eventually, 4 DL CCs and 2 UL CCs are left as activated CCs). In addition, the RIC may perform an option configured in the UE, in which 4 DL CCs and 6 UL CCs are reconfigured (CC de-configuration) among 8 NR CA CCs currently configured (eventually, 4 DL CCs and 2 UL CCs are left as added CCs). In addition, the RIC may indicate a method in which a CC of a certain frequency is left and a CC of another frequency is deactivated or is subjected to CC-release even if the same DL/UL CC is left.

The RIC may transmit to the RAN (gNB) a method of selecting a CC to be deactivated or subjected to CC-release, based on colocation/non-colocation information of the CC.

According to a configuration result of the RIC, the RAN may transmit a feedback of an execution result to the RIC. The feedback result may include an effect of resolving heating (a level of continuity for resolving a heating problem after a time taken to resolve the heating), when deactivation or CC-release is performed on a CC based on each configuration method.

Based on the feedback result, the RIC may correct and update a database policy and an AI learning result. The RIC may apply a correction and update result to a control/command/recommendation at a later time.

Although the RIC is a logical node in the disclosure, it may also be an independent device configured in hardware. When performing the operations of FIGS. 7 to 15, signaling may be performed through an individual E2 node and an E2 interface through a device in which an RIC function is implemented. The RIC may transmit a message to a DU node or may receive a message from the DU node. The RIC may transmit a message to a CU node or may receive a message from the CU. When a Control Plane (CP) and a User Plane (UP) are separated in the CU node, the RIC may transmit a message to a CU-CP node or may receive a message from the CU-CP. In addition, the RIC may transmit a message to a CU-UP node or may receive a message from the CU-UP.

In the aforementioned embodiments, signaling between the CU node and the RIC is described based on a situation in which the CU-CP and the RIC are independent hardware devices (or the CU and the RIC are independent devices). However, embodiments of the disclosure are not limited to such a deployment structure. According to an embodiment of the disclosure, for efficient hardware implementation, the RIC may be implemented together with the CU node. A device for performing the RIC may be configured to perform a function of the CU node. In addition, when the CU-UP and the CU-CP are separately implemented, the device for performing the RIC may be configured to perform a function of the CU-CP. Since the RIC and the CU-CP are implemented in one device (or as neighboring devices), signaling between two logical nodes and a delay time based thereon may be further decreased.

When obtaining information transferred from the UE or the core network, it is possible to obtain the information faster in time and in a more simplified manner, thereby achieving a purpose of an accurate and rapid UE control. The CU node and the device for performing the RIC function may obtain the UE assistance information and the expected UE behavior. The device may generate an RAN configuration such as paging configuration information, RNA configuration information, and measurement configuration information through an internal acquisition procedure through FIGS. 13 to 15, and may transfer the RAN configuration to a corresponding DU.

IPC cost may be reduced under the control of RRM of the RIC according to various embodiments of the disclosure. In particular, when the DU/CU/RIC are located in the same environment, cost for relaying a message may be reduced. The RIC may perform everything except for message transferring, thereby resolving an interoperability problem caused by operations between vendors. In addition, an intelligent function of the RIC may be upgraded to replace a specific function between the DU and CU-UPs.

Although an E2 control message may be individually defined based on an RAN function supportable for each E2 node by utilizing the existing E2SM-KPM, a constraint situation may occur in the implementation described with reference to FIGS. 10 to 11 when a multi-vendor is supported. Meanwhile, the RIC according to various embodiments of the disclosure may utilize the existing E2SM-NI and E2SM-KPM to control all of the O-CU-CP, the O-CU-UP, and the O-DU by using an RRC E2 control message which relays a control message. Since a total control is possible by using the RIC, efficient management may be performed. In particular, effective load balancing may be achieved in a service region in which vendors overlap.

2. Control of Non-RT RIC

Although the RIC exemplifies the near-RT as an operation between the E2 node and the RIC in the disclosure, embodiments of the disclosure are not limited thereto. Embodiments of the disclosure have a purpose of obtaining UE assistance information and expected UE behavior which are used to effectively configure an RAN. Therefore, a non-RT RIC may also collect the UE assistance information and the expected UE behavior, and may configure an RAN (e.g., paging configuration, RNA configuration, measurement configuration), based on the collected information.

A non-real time RAN Intelligent Controller (RIC) means an orchestration and automation function described in an O-RAN alliance for non-real-time intelligent management of a Radio Access Network (RAN) function. A main purpose of the non-RT RIC is to provide guidelines, parameters, policies, and AI/ML models for supporting non-real-time radio resource management, optimization of higher layer procedures, and policy optimization of the RAN and for supporting an operation of the near-RT RIC functions. In order to achieve a purpose of a higher level of non-real-time, the non-RT RIC function in the RAN may include a service and policy management, an RAN analysis, and model training for near real-time RIC.

The non-RT RIC may be implemented to communicate with a near-RT RIC element of the RAN through an A1 interface. The non-RT RIC may use the A1 interface to easily provide a policy for each UE or UE group. The non-RT RIC monitors and provides a basic feedback for a policy state in the near-RT RIC. The non-RT RIC may provide reinforcement information required in the near-RT RIC. The non-RT RIC may cooperate with the near-RT RIC to facilitate ML model training, deployment, and inference. The non-RT RIC function may partially utilize and extend the existing infra of SMO (e.g., Open Network Automation Platform (ONAP) or Management and Orchestration (MANO)) to support non-real-time control of a Radio Access Network (RAN).

The non-RT RIC may be included in Service Management and Orchestration (SMO). The non-RT RIC may be implemented as a function inside the SMO.

The SMO may be coupled to each node (O-DU, O-CU, O-CU-UP, O-CU-CP) through an O1 interface. The UE assistance information and the expected UE behavior may be transferred to the non-RT RIC through the O1 interface. The CU node may transmit the UE assistance information collected from the UE, to the SMO through the O1 interface. The UE assistance information is transferred to the non-RT RIC through the SMO. The CU node may transmit the expected UE behavior collected from the UE, to the SMO through the O1 interface. The expected UE behavior is transferred to the non-RT RIC through the SMO. The SMO may be coupled to not only each node of the O-RAN but also an entity of a core network (e.g., EPC and 5GC as a core of 3GPP). The SMO may be coupled to a core network of 5GC/EPC through a management interface. The SMO may obtain information on the expected UE behavior directly from the AMF. The SMO may transfer the directly obtained information to the non-RT RIC.

The non-RT RIC may be coupled to the near-RT RIC through an A1 interface. Policy information (hereinafter, A1 policy) may be provided through the A1 interface. According to an embodiment, the assistance information and the expected UE behavior may be transferred to the non-RT RIC through the A1 interface. That is, as described with reference to FIGS. 7 to 15, the near-RT RIC may obtain the assistance information and the expected UE behavior, and may provide the obtained information to the non-RT RIC again through the A1 interface.

The expected UE behavior information is information received by a gNB (or gNB-CU) from the AMF, and is transferred to the gNB through G interface messages. The expected UE behavior information may be expected HO interval information, expected UE mobility information, expected UE moving trajectory information (NG-RAN CGI, Time Stayed in Cell) specified in in 3GPP TS 38.413. For example, information in Table 3 above may be used for reference.

The expected HO interval information indicates an expected time interval between inter NG-RAN node handovers. When a 'long time' is included, an interval between the inter NG-RAN node handovers may be expected to be greater than or equal to 180 seconds.

The expected UE mobility information indicates whether the UE is in a stationary state or a mobile state.

The expected UE moving trajectory information (e.g., up to 16 pieces) indicates a UE's expected geographical movement. The expected UE moving trajectory information may include a list of visited cells and unvisited cells. In the list, the visited cells are enumerated in an order by which the cells are visited by the UE, and a most recent cell may be first in the list. The unvisited cell may be included immediately after an associated visited cell. In addition, the expected UE moving trajectory information may be included with respect to the visited cell, and may include information indicating a time (seconds) for which the UE stays in a cell. For example, when the UE stays in the cell for x seconds (x is an integer less than or equal to 4095), an IE may be set to x. In addition, when the UE stays in the cell for at least 4095 seconds, the IE may be set to 4095.

UE information of the UE assistance information corresponds to UE's configuration preference option or current state information. The UE assistance information may include DelayBudgetReport. The DelayBudgetReport means UE preference option information for adjustment of a Connected mode DRX (C-DRX) cycle. According to an embodiment, the UE assistance information may include OverheatingAssistance: UE preference option information regarding whether UE heating occurs and regarding a control when heated.

As described above, the non-RT RIC may obtain at least one of the expected UE behavior and the UE assistance information through the O1 interface or the A1 interface.

According to embodiments of the disclosure, the expected UE behavior or the UE assistance information may be obtained through the same interface or through different interfaces.

According to an embodiment of the disclosure, the non-RT RIC may obtain the expected UE behavior through the O1 interface, or may obtain the UE assistance information through the A1 interface. According to another embodiment of the disclosure, the non-RT RIC may obtain the expected UE behavior through the A1 interface, or may obtain the UE assistance information through the O1 interface. According to another embodiment of the disclosure, the non-RT RIC may obtain the expected UE behavior and the UE assistance information through the A1 interface, or may additionally obtain the expected UE behavior through the O1 interface. An example for the interface used for the obtaining the expected UE behavior or the UE assistance information may change within an obvious scope.

The non-RT RIC may perform AI/ML in a greater scale than the near-RT RIC, based on the obtained information. The non-RT RIC may generate configuration information of a relatively greater scale than RAN configuration in the near-RT RIC, based on the obtained information.

According to embodiments of the disclosure, not only the near-RT RIC but also the non-RT RIC may configure an RAN by predicting a UE mobility, based on the expected UE behavior information by which machine learning is performed by the AI/ML host. The AI/ML host may be disposed to be located in the non-RT RIC. For example, the near-RT RIC may configure a Tracking Area Code (TAC), and may perform an operation of configuring as a narrow TAC when the UE is the stationary UE and configuring as a wide RAC when the UE is the mobile UE. In addition thereto, the non-RT RIC may configure a TAC for a specific UE in a greater scale. For example, the non-RT RIC may not configure the TAC for a specific period of time with respect to the specific UE. When it is expected that there is no movement for a long period of time (e.g., previous history information, residence, company, etc.), the non-RT RIC may not configure the TAC for a specific period of time with respect to the specific UE. As another example, when a movement path is expected with respect to the specific UE, the non-RT RIC may configure the TAC in a time unit such as in units of hours/days/weeks.

According to embodiments of the disclosure, the non-RT RIC may configure an RAN, based on the UE assistance information. In case of OverheatingAssistance, the non-RT RIC may indicate a control method when a UE is heated, based on UE preference option information regarding whether UE heating occurs and regarding a control when heated. For example, the non-RT RIC may control a carrier aggregation carrier component, based on reducedMaxCCs supported by the UE. In addition thereto, the non-RT RIC may configure a CA configuration for the specific UE in a greater scale. For example, the non-RT RIC may limit the maximum number of CCs when CA is performed with respect to the specific UE for a long period of time. In addition, for example, the non-RT RIC may limit the maximum number of antennas available for the specific UE for the long period of time.

The RAN configuration based on the non-RT RIC may be transferred to each E2 node through at least one of the O1 interface and the A1 interface, similarly to the obtaining of the information. When the A1 interface is used, the non-RT RIC may provide the RAN configuration to a gNB-CU via the near-RT RIC. In addition, according to an embodiment, when the O1 interface is used, the non-RT RIC may provide the RAN configuration to the gNB-CU which is an individual node, through SMO.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a radio access network (RAN) intelligent controller (RIC), the method comprising:
    receiving a report message from an E2 node;
    generating a control message based on the report message; and
    transmitting the control message to the E2 node,
    wherein the control message includes an RAN configuration related to the E2 node, and
    wherein the report message includes one or more of user equipment (UE) assistance information received from a UE and expected UE behavior-related information received from an access and mobility management function (AMF),
    wherein the UE assistance information includes configurations preferred by the UE.

2. The method of claim 1, wherein the UE assistance information includes preference option information of the UE regarding an adjustment of a connected-discontinuous reception (C-DRX) cycle and preference option information of the UE regarding whether heating occurs and regarding a heating control.

3. The method of claim 1, wherein the expected UE behavior-related information is transferred from an information element (IE) of core network assistance information or CN-assisted RAN parameters tuning in an N2 message of the AMF.

4. The method of claim 1, wherein the expected UE behavior-related information includes handover expected time information, information indicating whether the UE is in a stationary state or a mobile state, and information related to a geographical movement of the UE.

5. The method of claim 1,
    wherein the E2 node is a gNodeB (gNB), a gNB-centralized unit (CU), or a gNB-control plane (CP),
    wherein the RAN configuration is generated based on the report message, and
    wherein the RAN configuration includes at least one of an RAN paging configuration, an RAN notification area (RNA) configuration, and a measurement configuration.

6. The method of claim 1, wherein the expected UE behavior-related information includes information indicating an expected UE moving trajectory indicating previously visited cells and non-visited cells.

7. The method of claim 1, wherein the expected UE behavior-related information includes information indicating a length of time in which the UE stayed in each visited cell.

8. A method performed by an E2 node, the method comprising:
    transmitting a report message to a radio access network (RAN) intelligent controller (RIC); and
    receiving a control message generated based on the report message from the E2 node,
    wherein the control message includes an RAN configuration related to the E2 node, and
    wherein the report message includes one or more of user equipment (UE) assistance information received from a UE and expected UE behavior-related information received from an access and mobility management function (AMF),
    wherein the UE assistance information includes configurations preferred by the UE.

9. The method of claim 8, wherein the UE assistance information includes preference option information of the UE regarding an adjustment of a connected-discontinuous reception (C-DRX) cycle and preference option information of the UE regarding whether heating occurs and regarding a heating control.

10. The method of claim 8, wherein the expected UE behavior-related information is transferred from an information element (IE) of core network assistance information or CN-assisted RAN parameters tuning in an N2 message of the AMF.

11. The method of claim 8, wherein the expected UE behavior-related information includes handover expected time information, information indicating whether the UE is in a stationary state or a mobile state, and information related to a geographical movement of the UE.

12. The method of claim 8,
wherein the E2 node is a gNodeB (gNB), a gNB-centralized unit (CU), or a gNB-control plane (CP),
wherein the RAN configuration is generated based on the report message, and
wherein the RAN configuration includes at least one of an RAN paging configuration, an RAN notification area (RNA) configuration, and a measurement configuration.

13. The method of claim 8, wherein the expected UE behavior-related information includes information indicating an expected UE moving trajectory indicating previously visited cells and non-visited cells.

14. The method of claim 8, wherein the expected UE behavior-related information includes information indicating a length of time in which the UE stayed in each visited cell.

15. An apparatus of a radio access network (RAN) intelligent controller (RIC), the apparatus comprising:
at least one transceiver; and
at least one processor configured to:
control the transceiver to receive a report message from an E2 node,
generate a control message based on the report message, and
control the transceiver to transmit the control message to the E2 node,
wherein the control message includes an RAN configuration related to the E2 node, and
wherein the report message includes one or more of user equipment (UE) assistance information received from a UE and expected UE behavior-related information received from an access and mobility management function (AMF),
wherein the UE assistance information includes configurations preferred by the UE.

16. The apparatus of claim 15, wherein the UE assistance information includes preference option information of the UE regarding an adjustment of a connected-discontinuous reception (C-DRX) cycle and preference option information of the UE regarding whether heating occurs and regarding a heating control.

17. The apparatus of claim 15, wherein the expected UE behavior-related information is transferred from an information element (IE) of core network assistance information or CN-assisted RAN parameters tuning in an N2 message of the AMF.

18. The apparatus of claim 15, wherein the expected UE behavior-related information includes handover expected time information, information indicating whether the UE is in a stationary state or a mobile state, and information related to a geographical movement of the UE.

19. The apparatus of claim 15,
wherein the E2 node is a gNodeB (gNB), a gNB-centralized unit (CU), or a gNB-control plane (CP),
wherein the RAN configuration is generated based on the report message, and
wherein the RAN configuration includes at least one of an RAN paging configuration, an RAN notification area (RNA) configuration, and a measurement configuration.

20. The apparatus of claim 15, wherein the expected UE behavior-related information includes at least one of:
information indicating an expected UE moving trajectory indicating previously visited cells and non-visited cells, or
information indicating a length of time in which the UE stayed in each visited cell.

\* \* \* \* \*